US00RE50204E

(19) United States
(12) Reissued Patent
Preiss et al.

(10) Patent Number: US RE50,204 E
(45) Date of Reissued Patent: Nov. 12, 2024

(54) PERFORATING GUN AND DETONATOR ASSEMBLY

(71) Applicant: DynaEnergetics Europe GmbH, Troisdorf (DE)

(72) Inventors: Frank Haron Preiss, Bonn (DE); Thilo Scharf, Letterkenny (IE); Liam McNelis, Bonn (DE)

(73) Assignee: DynaEnergetics Europe GmbH, Troisdorf (DE)

(21) Appl. No.: 16/287,150

(22) Filed: Feb. 27, 2019

Related U.S. Patent Documents

Reissue of:
(64) Patent No.: 9,581,422
Issued: Feb. 28, 2017
Appl. No.: 14/932,865
Filed: Nov. 4, 2015

U.S. Applications:
(63) Continuation of application No. 14/767,058, filed as application No. PCT/EP2014/065752 on Jul. 22, 2014, now Pat. No. 9,605,937.

(30) Foreign Application Priority Data

Aug. 26, 2013 (DE) ..... 102013109227.6

(51) Int. Cl.
*F42C 19/12* (2006.01)
*E21B 43/1185* (2006.01)

(52) U.S. Cl.
CPC ..... *F42C 19/12* (2013.01); *E21B 43/1185* (2013.01)

(58) Field of Classification Search
CPC ..... F42C 19/12; E21B 43/1185
See application file for complete search history.

(56) References Cited

U.S. PATENT DOCUMENTS 214,754 A 4/1879 Brock et al.
2,216,359 A 10/1940 Spencer
(Continued)

FOREIGN PATENT DOCUMENTS

CA 2021396 A1 1/1991
CA 2003166 A1 5/1991
(Continued)

OTHER PUBLICATIONS

Bear Manufacturing, LLC; Defendant Bear Manufacturing, LLC's Answer, Affirmative Defenses and Counterclaim in Response to Plaintiffs' Complaint for Civil Action No. 3:21-cv-00185-M; dated Mar. 22, 2021; 41 pages.
(Continued)

*Primary Examiner* — Jeffrey R Jastrzab
(74) *Attorney, Agent, or Firm* — Womble Bond Dickinson (US) LLP

(57) ABSTRACT

According to an aspect, a perforating gun assembly and a detonator assembly are provided. The detonator assembly includes at least a shell, and more than one electrically contactable component that is configured for being electrically contactably received by the perforating gun assembly without using a wired electrical connection, but rather forms the electrical connection merely by contact with at least one of the more than one electrically contactable components. According to an aspect, the detonator assembly includes a selective detonator assembly. A method of assembling the perforating gun assembly including the detonator assembly is also provided.

17 Claims, 4 Drawing Sheets

(56) References Cited

U.S. PATENT DOCUMENTS

| | | | |
|---|---|---|---|
| 2,228,873 | A | 1/1941 | Hardt et al. |
| 2,264,450 | A | 12/1941 | Mounce |
| 2,308,004 | A | 1/1943 | Hart |
| 2,326,406 | A | 8/1943 | Lloyd |
| 2,358,466 | A | 9/1944 | Miller |
| 2,418,486 | A | 4/1947 | Smylie |
| 2,543,814 | A | 3/1951 | Thompson et al. |
| 2,598,651 | A | 5/1952 | Spencer |
| 2,618,343 | A | 11/1952 | Conrad |
| 2,637,402 | A | 5/1953 | Baker et al. |
| 2,640,547 | A | 6/1953 | Baker et al. |
| 2,649,046 | A | 8/1953 | Oliver |
| 2,655,993 | A | 10/1953 | Lloyd |
| 2,681,114 | A | 6/1954 | Conrad |
| 2,692,023 | A | 10/1954 | Conrad |
| 2,695,064 | A | 11/1954 | Ragan et al. |
| 2,696,259 | A | 12/1954 | Greene |
| 2,708,408 | A | 5/1955 | Sweetman |
| 2,742,856 | A | 4/1956 | Fieser et al. |
| 2,761,384 | A | 9/1956 | Sweetman |
| 2,766,690 | A | 10/1956 | Lebourg |
| 2,785,631 | A | 3/1957 | Blanchard |
| 2,815,816 | A | 12/1957 | Baker |
| 2,873,675 | A | 2/1959 | Lebourg |
| 2,889,775 | A | 6/1959 | Owen |
| 2,906,339 | A | 9/1959 | Griffin |
| 2,946,283 | A | 7/1960 | Udry |
| 2,979,904 | A | 4/1961 | Royer |
| 2,996,591 | A | 8/1961 | Thomas |
| 3,024,843 | A | 3/1962 | Dean |
| 3,036,636 | A | 5/1962 | Clark |
| 3,040,659 | A | 6/1962 | Mcculleugh |
| 3,055,430 | A | 9/1962 | Campbell |
| 3,076,507 | A | 2/1963 | Sweetman |
| 3,080,005 | A | 3/1963 | Porter |
| RE25,407 | E | 6/1963 | Lebourg |
| 3,094,166 | A | 6/1963 | Mccullough |
| 3,128,702 | A | 4/1964 | Christopher |
| 3,154,632 | A | 10/1964 | Browne |
| 3,158,680 | A | 11/1964 | Lovitt et al. |
| 3,170,400 | A | 2/1965 | Nelson |
| 3,186,485 | A | 6/1965 | Owen |
| RE25,846 | E | 8/1965 | Campbell |
| 3,209,692 | A | 10/1965 | George |
| 3,211,093 | A | 10/1965 | Mccullough et al. |
| 3,211,222 | A | 10/1965 | Myers |
| 3,220,480 | A | 11/1965 | Myers |
| 3,233,674 | A | 2/1966 | Kurt |
| 3,244,232 | A | 4/1966 | Myers |
| 3,246,707 | A | 4/1966 | Bell |
| 3,264,989 | A | 8/1966 | Rucker |
| 3,264,994 | A | 8/1966 | Kurt |
| 3,298,437 | A | 1/1967 | Conrad |
| 3,320,884 | A | 5/1967 | Kowalick et al. |
| 3,327,792 | A | 6/1967 | Boop |
| 3,374,735 | A | 3/1968 | Moore |
| 3,398,803 | A | 8/1968 | Kurt et al. |
| 3,414,071 | A | 12/1968 | Alberts |
| 3,415,321 | A | 12/1968 | Venghiattis |
| 3,498,376 | A | 3/1970 | Sizer et al. |
| 3,504,723 | A | 4/1970 | Cushman et al. |
| 3,565,188 | A | 2/1971 | Hakala |
| D222,469 | S | 10/1971 | Flummer |
| 3,621,916 | A | 11/1971 | Smith, Jr. |
| 3,630,284 | A | 12/1971 | Fast et al. |
| 3,650,212 | A | 3/1972 | Bauer |
| 3,659,658 | A | 5/1972 | Brieger |
| 3,712,376 | A | 1/1973 | Young et al. |
| D227,763 | S | 7/1973 | Hand |
| 3,762,470 | A | 10/1973 | Eggleston |
| 3,859,921 | A | 1/1975 | Stephenson |
| 4,003,433 | A | 1/1977 | Goins |
| 4,007,790 | A | 2/1977 | Henning |
| 4,007,796 | A | 2/1977 | Boop |
| 4,034,673 | A | 7/1977 | Schneider, Jr. |
| 4,039,239 | A | 8/1977 | Cobaugh et al. |
| 4,058,061 | A | 11/1977 | Mansur, Jr. et al. |
| 4,064,935 | A | 12/1977 | Mohaupt |
| 4,071,096 | A | 1/1978 | Dines |
| 4,080,898 | A | 3/1978 | Gieske |
| 4,084,147 | A | 4/1978 | Mlyniec et al. |
| 4,085,397 | A | 4/1978 | Yagher |
| 4,107,453 | A | 8/1978 | Erixon |
| 4,132,171 | A | 1/1979 | Pawlak et al. |
| 4,140,188 | A | 2/1979 | Vann |
| 4,172,421 | A | 10/1979 | Regalbuto |
| 4,182,216 | A | 1/1980 | DeCaro |
| 4,208,966 | A | 6/1980 | Hart |
| 4,216,721 | A | 8/1980 | Marziano et al. |
| 4,220,087 | A | 9/1980 | Posson |
| 4,250,960 | A | 2/1981 | Chammas |
| 4,261,263 | A | 4/1981 | Coultas et al. |
| 4,266,613 | A | 5/1981 | Boop |
| 4,284,235 | A | 8/1981 | Diermayer et al. |
| 4,290,486 | A | 9/1981 | Regalbuto |
| 4,306,628 | A | 12/1981 | Adams, Jr. et al. |
| 4,312,273 | A | 1/1982 | Camp |
| 4,319,526 | A | 3/1982 | DerMott |
| 4,345,646 | A | 8/1982 | Terrell |
| 4,363,529 | A | 12/1982 | Loose |
| 4,387,773 | A | 6/1983 | McPhee |
| 4,393,946 | A | 7/1983 | Pottier et al. |
| 4,429,741 | A | 2/1984 | Hyland |
| 4,430,939 | A | 2/1984 | Harrold |
| 4,485,741 | A | 12/1984 | Moore et al. |
| 4,491,185 | A | 1/1985 | McClure |
| 4,496,008 | A | 1/1985 | Pottier et al. |
| 4,512,418 | A | 4/1985 | Regalbuto et al. |
| 4,523,649 | A | 6/1985 | Stout |
| 4,523,650 | A | 6/1985 | Sehnert et al. |
| 4,530,396 | A | 7/1985 | Mohaupt |
| 4,534,423 | A | 8/1985 | Regalbuto |
| 4,541,486 | A | 9/1985 | Wetzel et al. |
| 4,566,544 | A | 1/1986 | Bagley et al. |
| 4,574,892 | A | 3/1986 | Grigar et al. |
| 4,576,233 | A | 3/1986 | George |
| 4,583,602 | A | 4/1986 | Ayers |
| 4,598,775 | A | 7/1986 | Vann et al. |
| 4,609,056 | A | 9/1986 | Colle, Jr. et al. |
| 4,609,057 | A | 9/1986 | Walker et al. |
| 4,617,997 | A | 10/1986 | Jennings, Jr. |
| 4,619,320 | A | 10/1986 | Adnyana et al. |
| 4,620,591 | A | 11/1986 | Terrell et al. |
| 4,621,396 | A | 11/1986 | Walker et al. |
| 4,629,001 | A | 12/1986 | Miller et al. |
| 4,640,354 | A | 2/1987 | Boisson |
| 4,643,097 | A | 2/1987 | Chawla et al. |
| 4,650,009 | A | 3/1987 | McClure et al. |
| 4,657,089 | A | 4/1987 | Stout |
| 4,660,910 | A | 4/1987 | Sharp et al. |
| 4,662,450 | A | 5/1987 | Haugen |
| 4,670,729 | A | 6/1987 | Oh |
| 4,730,793 | A | 3/1988 | Thurber, Jr. et al. |
| 4,744,424 | A | 5/1988 | Lendermon et al. |
| 4,747,201 | A | 5/1988 | Donovan et al. |
| 4,753,170 | A | 6/1988 | Regalbuto et al. |
| 4,762,067 | A | 8/1988 | Barker et al. |
| 4,766,813 | A | 8/1988 | Winter et al. |
| 4,769,734 | A | 9/1988 | Heinemeyer et al. |
| 4,776,393 | A | 10/1988 | Forehand et al. |
| 4,790,383 | A | 12/1988 | Savage et al. |
| 4,796,708 | A | 1/1989 | Lembcke |
| 4,798,244 | A | 1/1989 | Trost |
| 4,800,815 | A | 1/1989 | Appledom et al. |
| 4,830,120 | A | 5/1989 | Stout |
| 4,840,231 | A | 6/1989 | Berzin et al. |
| 4,852,494 | A | 8/1989 | Williams |
| 4,852,647 | A | 8/1989 | Mohaupt |
| 4,869,171 | A | 9/1989 | Abouav |
| 4,884,506 | A | 12/1989 | Guerreri |
| 4,889,183 | A | 12/1989 | Sommers et al. |
| 5,006,833 | A | 4/1991 | Marlowe et al. |
| 5,024,270 | A | 6/1991 | Bostick |

(56) References Cited

U.S. PATENT DOCUMENTS 5,027,708 A * 7/1991 Gonzalez ..... F42D 1/04 102/202.1
5,038,682 A 8/1991 Marsden
5,052,489 A 10/1991 Carisella et al.
5,060,573 A 10/1991 Montgomery et al.
5,070,788 A 12/1991 Carisella et al.
5,088,413 A * 2/1992 Huber ..... F42B 3/124 102/200
5,090,321 A 2/1992 Abouav
5,090,324 A 2/1992 Bocker et al.
5,105,742 A 4/1992 Sumner
5,119,729 A 6/1992 Nguyen
5,155,296 A 10/1992 Michaluk
5,159,145 A 10/1992 Carisella et al.
5,159,146 A 10/1992 Carisella et al.
5,165,489 A 11/1992 Langston
5,204,491 A 4/1993 Aureal et al.
5,216,197 A 6/1993 Huber et al.
5,322,019 A 6/1994 Hyland
5,347,929 A * 9/1994 Lerche ..... E21B 43/1185 102/202.14
5,358,418 A 10/1994 Carmichael
5,366,013 A 11/1994 Edwards et al.
5,392,851 A 2/1995 Arend
5,392,860 A 2/1995 Ross
5,436,791 A 7/1995 Turano et al.
5,447,202 A 9/1995 Littleford
5,456,319 A 10/1995 Schmidt et al.
5,479,860 A 1/1996 Ellis
5,503,077 A 4/1996 Motley
5,511,620 A 4/1996 Baugh et al.
5,540,154 A 7/1996 Wilcox et al.
5,551,346 A 9/1996 Walters et al.
5,551,520 A 9/1996 Bethel et al.
5,571,986 A 11/1996 Snider et al.
5,603,384 A 2/1997 Bethel et al.
5,648,635 A 7/1997 Lussier et al.
5,671,899 A 9/1997 Nicholas et al.
5,703,319 A 12/1997 Fritz et al.
5,732,869 A 3/1998 Hirtl
5,756,926 A 5/1998 Bonbrake et al.
5,775,426 A 7/1998 Snider et al.
5,785,130 A 7/1998 Wesson et al.
5,803,175 A 9/1998 Myers, Jr. et al.
5,816,343 A 10/1998 Markel et al.
5,820,402 A 10/1998 Chiacchio et al.
5,837,925 A 11/1998 Nice
5,859,383 A 1/1999 Davison et al.
5,992,289 A 11/1999 George et al.
D418,210 S 12/1999 Roesch
6,006,833 A 12/1999 Burleson et al.
6,012,525 A 1/2000 Burleson et al.
6,082,450 A 7/2000 Snider et al.
6,085,659 A 7/2000 Beukes et al.
6,112,666 A 9/2000 Murray et al.
6,164,375 A 12/2000 Carisella
6,263,283 B1 7/2001 Snider et al.
6,272,782 B1 8/2001 Dittrich et al.
6,295,912 B1 10/2001 Burleson et al.
6,298,915 B1 10/2001 George
6,305,287 B1 10/2001 Capers et al.
6,333,699 B1 12/2001 Zierolf
6,349,767 B2 2/2002 Gissler
6,354,374 B1 3/2002 Edwards et al.
6,385,031 B1 5/2002 Lerche et al.
6,386,108 B1 5/2002 Brooks et al.
6,408,758 B1 6/2002 Duguet
6,412,388 B1 7/2002 Frazier
6,412,415 B1 7/2002 Kothari et al.
6,414,905 B1 7/2002 Owens et al.
6,418,853 B1 7/2002 Duguet et al.
6,419,044 B1 7/2002 Tite et al.
6,435,096 B1 8/2002 Watson
6,439,121 B1 8/2002 Gillingham
6,467,387 B1 10/2002 Espinosa et al.
6,467,415 B2 10/2002 Menzel et al.
6,474,931 B1 11/2002 Austin et al.
6,487,973 B1 12/2002 Gilbert, Jr. et al.
6,497,285 B2 12/2002 Walker
6,502,736 B2 1/2003 Dittrich et al.
6,582,251 B1 6/2003 Burke et al.
6,618,237 B2 9/2003 Eddy et al.
6,651,747 B2 11/2003 Chen et al.
6,659,180 B2 12/2003 Moss
6,675,896 B2 1/2004 George
6,702,009 B1 3/2004 Drury et al.
6,719,061 B2 4/2004 Muller et al.
6,739,265 B1 5/2004 Badger et al.
6,742,602 B2 6/2004 Trotechaud
6,752,083 B1 6/2004 Lerche et al.
6,763,883 B2 7/2004 Green et al.
6,779,605 B2 8/2004 Jackson
6,843,317 B2 1/2005 Mackenzie
6,851,471 B2 2/2005 Barlow et al.
6,880,637 B2 4/2005 Myers, Jr. et al.
6,918,334 B2 7/2005 Trotechaud
7,013,977 B2 3/2006 Nordaas
7,044,230 B2 5/2006 Starr et al.
7,066,280 B2 6/2006 Sullivan et al.
7,086,481 B2 8/2006 Hosie et al.
7,093,664 B2 8/2006 Todd et al.
7,104,323 B2 9/2006 Cook et al.
7,107,908 B2 9/2006 Forman et al.
7,128,162 B2 10/2006 Quinn
D532,947 S 11/2006 Muscarella
7,168,494 B2 1/2007 Starr et al.
7,182,625 B2 2/2007 Machado et al.
7,193,527 B2 * 3/2007 Hall ..... G01V 11/002 175/40
7,228,906 B2 6/2007 Snider et al.
7,237,626 B2 7/2007 Gurjar et al.
7,243,722 B2 7/2007 Oosterling et al.
7,278,482 B2 10/2007 Azar
7,278,491 B2 10/2007 Scott
7,347,278 B2 * 3/2008 Lerche ..... E21B 41/00 102/215
7,347,279 B2 3/2008 Li et al.
7,353,879 B2 4/2008 Todd et al.
7,357,083 B2 4/2008 Takahara et al.
7,364,451 B2 4/2008 Ring et al.
7,387,162 B2 6/2008 Mooney, Jr. et al.
7,428,932 B1 9/2008 Wintill et al.
7,431,075 B2 10/2008 Brooks et al.
7,441,601 B2 10/2008 George et al.
7,487,827 B2 2/2009 Tiernan
7,493,945 B2 2/2009 Doane et al.
7,510,017 B2 3/2009 Howell et al.
7,533,722 B2 5/2009 George et al.
7,540,758 B2 6/2009 Ho
7,565,927 B2 7/2009 Gerez et al.
7,568,429 B2 8/2009 Hummel et al.
7,591,212 B2 9/2009 Myers, Jr. et al.
7,604,062 B2 10/2009 Murray
7,721,650 B2 5/2010 Barton et al.
7,726,396 B2 6/2010 Briquet et al.
7,735,578 B2 6/2010 Loehr et al.
7,748,457 B2 7/2010 Walton et al.
7,752,971 B2 7/2010 Loehr
7,762,172 B2 7/2010 Li et al.
7,762,331 B2 7/2010 Goodman et al.
7,762,351 B2 7/2010 Vidal
7,775,279 B2 8/2010 Marya et al.
7,778,006 B2 8/2010 Stewart et al.
7,779,926 B2 8/2010 Turley et al.
7,810,430 B2 10/2010 Chan et al.
7,896,077 B2 3/2011 Behrmann et al.
7,901,247 B2 3/2011 Ring
7,905,290 B2 3/2011 Schicks
7,908,970 B1 3/2011 Jakaboski et al.
7,929,270 B2 4/2011 Hummel et al.
7,934,453 B2 5/2011 Moore
7,980,874 B2 7/2011 Finke et al.
8,028,624 B2 10/2011 Mattson
8,066,083 B2 11/2011 Hales et al.

(56) References Cited

U.S. PATENT DOCUMENTS 8,069,789 B2 * 12/2011 Hummel ..... F42B 3/103 102/202.12
8,074,737 B2 12/2011 Hill et al.
8,079,296 B2 12/2011 Barton et al.
8,091,477 B2 1/2012 Brooks et al.
8,127,846 B2 3/2012 Hill et al.
8,136,439 B2 3/2012 Bell
8,141,434 B2 3/2012 Kippersund et al.
8,141,639 B2 3/2012 Gartz et al.
8,151,882 B2 4/2012 Grigar et al.
8,157,022 B2 4/2012 Bertoja et al.
8,165,714 B2 4/2012 Mier et al.
8,181,718 B2 5/2012 Burleson et al.
8,182,212 B2 5/2012 Parcell
8,186,259 B2 5/2012 Burleson et al.
8,186,425 B2 5/2012 Smart et al.
8,230,788 B2 7/2012 Brooks et al.
8,230,946 B2 7/2012 Crawford et al.
8,256,337 B2 * 9/2012 Hill ..... E21B 43/1185 89/1.15
8,322,426 B2 12/2012 Wright et al.
8,336,437 B2 12/2012 Barlow et al.
8,388,374 B2 3/2013 Grek et al.
8,395,878 B2 3/2013 Stewart et al.
8,397,741 B2 3/2013 Bisset
8,413,727 B2 4/2013 Holmes
8,443,915 B2 5/2013 Storm, Jr. et al.
8,451,137 B2 5/2013 Bonavides et al.
8,468,944 B2 6/2013 Givens et al.
8,469,087 B2 6/2013 Gray
8,474,533 B2 7/2013 Miller et al.
D689,590 S 9/2013 Brose
8,561,683 B2 10/2013 Wood et al.
8,576,090 B2 11/2013 Erche et al.
8,596,378 B2 12/2013 Mason et al.
8,661,978 B2 3/2014 Backhus et al.
8,678,666 B2 3/2014 Scadden et al.
8,689,868 B2 4/2014 Lerche et al.
8,695,506 B2 4/2014 Lanclos
8,746,144 B2 6/2014 Givens et al.
8,752,486 B2 6/2014 Robertson et al.
8,770,271 B2 7/2014 Fielder et al.
D712,013 S 8/2014 Mather et al.
8,807,003 B2 8/2014 Le et al.
8,833,441 B2 9/2014 Fielder et al.
8,863,665 B2 10/2014 DeVries et al.
8,869,887 B2 10/2014 Deere et al.
8,875,787 B2 11/2014 Tassaroli
8,881,816 B2 11/2014 Glenn et al.
8,881,836 B2 11/2014 Ingram
8,884,778 B2 11/2014 Lerche et al.
8,943,943 B2 2/2015 Tassaroli
8,960,093 B2 2/2015 Preiss et al.
8,960,288 B2 2/2015 Sampson
9,080,405 B2 7/2015 Carisella
9,080,433 B2 7/2015 Anclos et al.
9,145,763 B1 9/2015 Sites, Jr.
9,145,764 B2 9/2015 Burton et al.
9,181,790 B2 11/2015 Mace et al.
9,194,219 B1 11/2015 Hardesty et al.
9,206,675 B2 12/2015 Hales et al.
9,284,819 B2 3/2016 Tolman et al.
9,284,824 B2 3/2016 Fadul et al.
9,317,038 B2 4/2016 Ozick et al.
9,328,559 B2 5/2016 Schwarz et al.
9,347,755 B2 5/2016 Backhus et al.
9,359,863 B2 6/2016 Streich et al.
9,383,237 B2 7/2016 Wiklund et al.
9,476,272 B2 10/2016 Carisella et al.
9,482,069 B2 11/2016 Powers
9,488,024 B2 11/2016 Hoffman et al.
9,494,021 B2 11/2016 Parks et al.
9,523,271 B2 12/2016 Bonavides et al.
9,581,422 B2 2/2017 Preiss et al.
9,587,466 B2 3/2017 Burguieres et al.
9,598,942 B2 3/2017 Wells et al.
9,605,937 B2 3/2017 Eitschberger et al.
9,677,363 B2 6/2017 Schacherer et al.
9,689,223 B2 6/2017 Schacherer et al.
9,689,240 B2 6/2017 LaGrange et al.
9,695,673 B1 7/2017 Latiolais
9,702,211 B2 7/2017 Tinnen
9,709,373 B2 7/2017 Hikone et al.
9,726,005 B2 8/2017 Hallundbaek et al.
9,771,769 B2 9/2017 Baker et al.
9,835,006 B2 12/2017 George et al.
9,879,501 B2 1/2018 Hammer et al.
9,995,115 B2 6/2018 Kasperski
10,018,018 B2 7/2018 Cannon et al.
10,036,236 B1 7/2018 Sullivan et al.
10,077,626 B2 9/2018 Xu et al.
10,077,641 B2 9/2018 Rogman et al.
10,151,181 B2 12/2018 Lopez et al.
10,167,691 B2 1/2019 Zhang et al.
10,190,398 B2 1/2019 Goodman et al.
10,267,611 B2 4/2019 Lownds et al.
10,352,144 B2 7/2019 Entchev et al.
10,422,195 B2 9/2019 LaGrange et al.
10,428,595 B2 10/2019 Bradley et al.
10,429,161 B2 10/2019 Parks et al.
10,429,938 B2 10/2019 Chakra et al.
D873,373 S 1/2020 Hartman et al.
10,689,955 B1 6/2020 Mauldin et al.
2002/0020320 A1 2/2002 Lebaudy et al.
2002/0062991 A1 5/2002 Farrant et al.
2002/0129940 A1 9/2002 Yang et al.
2003/0000411 A1 * 1/2003 Cernocky ..... E21B 43/1185 102/200
2003/0000703 A1 * 1/2003 Cernocky ..... E21B 47/12 166/55.1
2003/0001753 A1 1/2003 Cernocky et al.
2004/0141279 A1 7/2004 Amano et al.
2004/0211862 A1 10/2004 Elam
2005/0011390 A1 1/2005 Jennings
2005/0178282 A1 8/2005 Brooks et al.
2005/0183610 A1 8/2005 Barton et al.
2005/0186823 A1 8/2005 Ring et al.
2005/0194146 A1 9/2005 Barker et al.
2005/0218260 A1 10/2005 Corder et al.
2005/0229805 A1 10/2005 Myers, Jr. et al.
2006/0081374 A1 4/2006 Bland et al.
2007/0125540 A1 6/2007 Gerez et al.
2007/0158071 A1 7/2007 Mooney, Jr. et al.
2008/0047716 A1 2/2008 McKee et al.
2008/0110612 A1 5/2008 Prinz et al.
2008/0110632 A1 5/2008 Beall
2008/0134922 A1 6/2008 Grattan et al.
2008/0149338 A1 6/2008 Goodman et al.
2008/0173204 A1 7/2008 Anderson et al.
2008/0173240 A1 7/2008 Furukawahara et al.
2008/0264639 A1 10/2008 Parrott et al.
2009/0050322 A1 2/2009 Hill et al.
2009/0159285 A1 6/2009 Goodman
2009/0272519 A1 11/2009 Green et al.
2009/0272529 A1 11/2009 Crawford
2009/0301723 A1 12/2009 Gray
2010/0000789 A1 1/2010 Barton et al.
2010/0012774 A1 1/2010 Fanucci et al.
2010/0089643 A1 4/2010 Vidal
2010/0096131 A1 4/2010 Hill et al.
2010/0107917 A1 5/2010 Moser
2010/0163224 A1 7/2010 Strickland
2010/0230104 A1 9/2010 Nölke et al.
2010/0252323 A1 10/2010 Goodman et al.
2010/0286800 A1 11/2010 Lerche et al.
2010/0307773 A1 12/2010 Tinnen et al.
2011/0024116 A1 2/2011 McCann et al.
2011/0042069 A1 2/2011 Bailey et al.
2011/0301784 A1 12/2011 Oakley et al.
2012/0006217 A1 1/2012 Anderson
2012/0085538 A1 4/2012 Guerrero et al.
2012/0094553 A1 4/2012 Fujiwara et al.
2012/0160483 A1 6/2012 Carisella

(56) References Cited

U.S. PATENT DOCUMENTS

| | | | | |
|---|---|---|---|---|
| 2012/0199031 | A1* | 8/2012 | Lanclos | E21B 43/1185 102/206 |
| 2012/0199352 | A1 | 8/2012 | Lanclos et al. | |
| 2012/0241169 | A1 | 9/2012 | Hales et al. | |
| 2012/0242135 | A1 | 9/2012 | Thomson et al. | |
| 2012/0247769 | A1 | 10/2012 | Schacherer et al. | |
| 2012/0247771 | A1* | 10/2012 | Black | E21B 43/1185 166/297 |
| 2012/0298361 | A1 | 11/2012 | Sampson | |
| 2013/0008639 | A1 | 1/2013 | Tassaroli | |
| 2013/0043074 | A1 | 2/2013 | Tassaroli | |
| 2013/0062055 | A1 | 3/2013 | Tolman et al. | |
| 2013/0118342 | A1 | 5/2013 | Tassaroli | |
| 2013/0199843 | A1 | 8/2013 | Ross | |
| 2013/0248174 | A1 | 9/2013 | Dale et al. | |
| 2013/0256464 | A1 | 10/2013 | Belik et al. | |
| 2014/0033939 | A1 | 2/2014 | Priess et al. | |
| 2014/0053750 | A1 | 2/2014 | Lownds et al. | |
| 2014/0060839 | A1 | 3/2014 | Wang et al. | |
| 2014/0131035 | A1 | 5/2014 | Entchev et al. | |
| 2014/0166370 | A1 | 6/2014 | Silva | |
| 2014/0318766 | A1 | 10/2014 | Bishop | |
| 2015/0075783 | A1 | 3/2015 | Angman et al. | |
| 2015/0176386 | A1 | 6/2015 | Castillo et al. | |
| 2015/0226044 | A1 | 8/2015 | Ursi et al. | |
| 2015/0260496 | A1 | 9/2015 | Backhus et al. | |
| 2015/0330192 | A1 | 11/2015 | Rogman et al. | |
| 2015/0356403 | A1 | 12/2015 | Storm, Jr. | |
| 2016/0061572 | A1 | 3/2016 | Eitschberger et al. | |
| 2016/0084048 | A1 | 3/2016 | Harrigan et al. | |
| 2016/0168961 | A1 | 6/2016 | Parks et al. | |
| 2016/0186511 | A1 | 6/2016 | Coronado et al. | |
| 2016/0202033 | A1 | 7/2016 | Shahinpour et al. | |
| 2016/0281466 | A1 | 9/2016 | Richards | |
| 2017/0030693 | A1 | 2/2017 | Preiss et al. | |
| 2017/0044865 | A1 | 2/2017 | Sabins et al. | |
| 2017/0268320 | A1 | 9/2017 | Angman et al. | |
| 2017/0276465 | A1 | 9/2017 | Parks et al. | |
| 2017/0298716 | A1 | 10/2017 | McConnell et al. | |
| 2017/0314373 | A9 | 11/2017 | Bradley et al. | |
| 2017/0328134 | A1 | 11/2017 | Sampson et al. | |
| 2018/0080298 | A1 | 3/2018 | Covalt et al. | |
| 2018/0080300 | A1 | 3/2018 | Angstmann et al. | |
| 2018/0094910 | A1 | 4/2018 | Ashton et al. | |
| 2018/0106121 | A1 | 4/2018 | Griffin et al. | |
| 2018/0119529 | A1 | 5/2018 | Goyeneche | |
| 2018/0120066 | A1 | 5/2018 | Khatiwada et al. | |
| 2018/0148995 | A1 | 5/2018 | Burky et al. | |
| 2018/0202789 | A1 | 7/2018 | Parks et al. | |
| 2018/0231361 | A1 | 8/2018 | Wicks et al. | |
| 2018/0274356 | A1 | 9/2018 | Hazel | |
| 2018/0363424 | A1 | 12/2018 | Schroeder et al. | |
| 2019/0106962 | A1 | 4/2019 | Lee et al. | |
| 2019/0162056 | A1 | 5/2019 | Sansing | |
| 2019/0219375 | A1 | 7/2019 | Parks et al. | |
| 2019/0234188 | A1 | 8/2019 | Goyeneche | |
| 2019/0366272 | A1 | 12/2019 | Eitschberger et al. | |
| 2020/0063537 | A1 | 2/2020 | Langford et al. | |
| 2020/0199983 | A1 | 6/2020 | Preiss et al. | |

FOREIGN PATENT DOCUMENTS

| | | | | |
|---|---|---|---|---|
| CA | 2821506 | A1 | 1/2015 | |
| CA | 2824838 | A1 | 2/2015 | |
| CN | 85107897 | A | 9/1986 | |
| CN | 2661919 | | 12/2004 | |
| CN | 2821154 | | 9/2006 | |
| CN | 2823549 | | 10/2006 | |
| CN | 1284750 | C | 11/2006 | |
| CN | 101397890 | A | 4/2009 | |
| CN | 101454635 | A | 6/2009 | |
| CN | 101691837 | B | 4/2010 | |
| CN | 201620848 | U | 11/2010 | |
| CN | 201764910 | U | 3/2011 | |
| CN | 102878877 | A | 1/2013 | |
| CN | 103993861 | A | 8/2014 | |
| CN | 104499977 | A | 4/2015 | |
| CN | 104481492 | B | 6/2019 | |
| DE | 102007007498 | | 10/2015 | |
| EP | 0088516 | A1 | 9/1983 | |
| EP | 0416915 | A2 | 3/1991 | |
| EP | 0180520 | B1 | 5/1991 | |
| EP | 332287 | B1 | 7/1992 | |
| EP | 679859 | A2 | 11/1995 | |
| EP | 694157 | B1 | 8/2001 | |
| EP | 2702349 | B1 | 11/2015 | |
| EP | 2310616 | B1 | 10/2017 | |
| EP | 3077612 | B1 | 5/2020 | |
| GB | 2065750 | B | 6/1983 | |
| GB | 2383236 | B | 1/2004 | |
| JP | 2003329399 | A | 11/2003 | |
| RU | 2087693 | C1 | 8/1997 | |
| RU | 2204706 | C1 | 5/2003 | |
| RU | 30160 | U1 | 6/2003 | |
| RU | 2221141 | C1 | 1/2004 | |
| RU | 2295694 | C2 | 3/2007 | |
| RU | 2312981 | C2 | 12/2007 | |
| RU | 93521 | U1 | 4/2010 | |
| RU | 98047 | U1 | 9/2010 | |
| RU | 100552 | U1 | 12/2010 | |
| RU | 2434122 | C2 | 11/2011 | |
| RU | 2439312 | C1 | 1/2012 | |
| RU | 2633904 | C1 | 10/2017 | |
| RU | 2659934 | C2 * | 7/2018 | B01D 61/20 |
| WO | 9721067 | A1 | 6/1997 | |
| WO | 2000020821 | A1 | 4/2000 | |
| WO | 0133029 | A2 | 5/2001 | |
| WO | WO-0159401 | A1 | 8/2001 | |
| WO | WO-2009091422 | A2 | 7/2009 | |
| WO | 2009091422 | A3 | 3/2010 | |
| WO | 2011160099 | A1 | 12/2011 | |
| WO | 2012006357 | A2 | 1/2012 | |
| WO | 2012135101 | A2 | 10/2012 | |
| WO | 2012106640 | A3 | 11/2012 | |
| WO | 2012149584 | A1 | 11/2012 | |
| WO | 2014046670 | A1 | 3/2014 | |
| WO | 2014089194 | A1 | 6/2014 | |
| WO | 2014178725 | A1 | 11/2014 | |
| WO | WO-2015006869 | A1 | 1/2015 | |
| WO | 2015134719 | A1 | 9/2015 | |
| WO | 2016100064 | A1 | 6/2016 | |
| WO | 2016100269 | A1 | 6/2016 | |
| WO | 2017041772 | A1 | 3/2017 | |
| WO | 2017125745 | A1 | 7/2017 | |
| WO | 2018136808 | A1 | 7/2018 | |
| WO | 2018213768 | A1 | 11/2018 | |

OTHER PUBLICATIONS

Dynaenergetics Europe GMBH, OSO Perforating, LLC, SWM International, LLC and Bear Manufacturing, LLC; Joint Claim Construction Statement for Northern District of Texas Civil Action Nos. 3:21-cv-00188, 3:21-cv-00192 and 3:21-cv-00185; dated Sep. 28, 2021; 29 pages.

Dynaenergetics Europe GMBH; Patent Owner's Preliminary Response for PGR2021-00078; dated Aug. 19, 2021; 114 pages.

Dynaenergetics Europe GMBH; Plaintiff's Preliminary Infringement Contentions for Civil Action No. 6:21-cv-01110; dated Jul. 6, 2021; 6 pages.

Dynaenergetics Europe, GMBH; DynaEnergetics' Preliminary Claim Construction and Extrinsic Evidence for Civil Action No. 4:21-cv-00280; dated Aug. 4, 2021; 10 pages.

G&H Diversified Manufacturing, LP and Dynaenergetics Europe GMBH; Joint Claim Construction Statement for Civil Action No. 3:20-cv-00376; dated Jul. 8, 2021; 14 pages.

G&H Diversified Manufacturing, LP; Defendant G&H Diversified Manufacturing, LP's Answer to Counter—Claim Plaintiffs' Counter—Claims for Civil Action No. 3:20-cv-00376; dated Apr. 19, 2021; 13 pages.

(56) References Cited

OTHER PUBLICATIONS

G&H Diversified Manufacturing, LP; Defendants' Preliminary Invalidity Contentions for Civil Action No. 3:20-cv-00376; dated May 6, 2021; 20 pages.
G&H Diversified Manufacturing, LP; Plaintiff and Counterclaim Defendant G&H Diversified Manufacturing, LP and Counterclaim Defendant Yellow Jacket Oil Tools, LLC's First Supplemental Proposed Constructions; dated Jun. 24, 2021; 7 pages.
G&H Diversified Manufacturing, LP; Plaintiff and Counterclaim Defendant G&H Diversified Manufacturing, LP and Counterclaim Defendant Yellow Jacket Oil Tools, LLC's Proposed Constructions; dated Jun. 10, 2021; 7 pages.
G&H Diversified Manufacturing, LP; Redated Petition for Post Grant Review for PGR2021-00078; dated May 10, 2021; 20 pages.
G&H Diversified Manufacturing, LP; Reply to Preliminary Response for PGR No. PGR2021-00078; dated Sep. 14, 2021; 18 pages.
GR Energy Operating GP LLC, GR Energy Services Management, LP and GR Energy Services, LLC; Exhibit A U.S. Pat. No. 10,844,697 vs Castel; dated Aug. 30, 2021; 88 pages.
GR Energy Operating GP LLC, GR Energy Services Management, LP and GR Energy Services, LLC; Exhibit B U.S. Pat. No. 10,844,697 vs Goodman; dated Aug. 30, 2021; 36 pages.
GR Energy Operating GP LLC, GR Energy Services Management, LP and GR Energy Services, LLC; Exhibit C U.S. Pat. No. 10,844,697 vs Hromas; dated Aug. 30, 2021; 27 pages.
GR Energy Operating GP LLC, GR Energy Services Management, LP and GR Energy Services, LLC; Exhibit D U.S. Pat. No. 10,844,697 vs Boop 768; dated Aug. 30, 2021; 35 pages.
GR Energy Operating GP LLC, GR Energy Services Management, LP and GR Energy Services, LLC; Exhibit E U.S. Pat. No. 10,844,697 vs Boop 792; dated Aug. 30, 2021; 52 pages.
GR Energy Operating GP LLC, GR Energy Services Management, LP and GR Energy Services, LC; Exhibit F U.S. Pat. No. 10,844,697 vs Boop 378; dated Aug. 30, 2021; 34 pages.
GR Energy Operating GP LLC, GR Energy Services Management, LP and GR Energy Services, LC; Exhibit G U.S. Pat. No. 10,844,697 vs Bickford; dated Aug. 30, 2021; 7 pages.
GR Energy Operating GP LLC, GR Energy Services Management, LP and GR Energy Services, LLC; Exhibit H U.S. Pat. No. 10,844,697 vs Black; dated Aug. 30, 2021; 33 pages.
GR Energy Operating GP LLC, GR Energy Services Management, LP and GR Energy Services, LLC; Exhibit I U.S. Pat. No. 10,844,697 vs Rogman; dated Aug. 30, 2021; 59 pages.
GR Energy Operating GP LLC, GR Energy Services Management, LP and GR Energy Services, LLC; Exhibit J U.S. Pat. No. 10,844,697 vs Burton; dated Aug. 30, 2021; 57 pages.
GR Energy Operating GP LLC, GR Energy Services Management, LP and GR Energy Services, LLC; Exhibit K U.S. Pat. No. 10,844,697 vs Borgfeld; dated Aug. 30, 2021; 36 pages.
GR Energy Operating GP LLC, GR Energy Services Management, LP and GR Energy Services, LLC; Exhibit L U.S. Pat. No. 10,844,697 vs Boop '383; dated Aug. 30, 2021; 24 pages.
GR Energy Operating GP LLC, GR Energy Services Management, LP and GR Energy Services, LLC; Exhibit M U.S. Pat. No. 10,844,697 vs Boop '992; dated Aug. 30, 2021; 14 pages.
GR Energy Operating GP LLC, GR Energy Services Management, LP and GR Energy Services, LLC; Exhibit N U.S. Pat. No. 10,844,697 vs Deere; dated Aug. 30, 2021; 14 pages.
GR Energy Operating GP LLC, GR Energy Services Management, LP and GR Energy Services, LLC; Exhibit O U.S. Pat. No. 10,844,697 vs Harrigan Provisional; dated Aug. 30, 2021; 26 pages.
GR Energy Operating GP LLC, GR Energy Services Management, LP and GR Energy Services, LLC; Exhibit P U.S. Pat. No. 10,844,697 vs Burke '251; dated Aug. 30, 2021; 7 pages.
GR Energy Operating GP LLC, GR Energy Services Management, LP and GR Energy Services, LC; Exhibit Q U.S. Pat. No. 10,844,697 vs Runkel; dated Aug. 30, 2021; 7 pages.
GR Energy Operating GP LLC, GR Energy Services Management, LP and GR Energy Services, LLC; Exhibit R U.S. Pat. No. 10,844,697 vs Tassaroli; dated Aug. 30, 2021; 10 pages.
GR Energy Operating GP LLC, GR Energy Services Management, LP and GR Energy Services, LLC; Exhibit S U.S. Pat. No. 10,844,697 vs Harrigan '048; dated Aug. 30, 2021; 7 pages.
GR Energy Operating GP LLC, GR Energy Services Management, LP and GR Energy Services, LLC; Exhibit T U.S. Pat. No. 10,844,697 vs Select-Fire System; dated Aug. 30, 2021; 36 pages.
GR Energy Operating GP LLC, GR Energy Services Management, LP and GR Energy Services, LLC; Exhibit U U.S. Pat. No. 10,844,697 vs New Select—Fire System; dated Aug. 30, 2021; 37 pages.
GR Energy Operating GP LLC, GR Energy Services Management, LP and GR Energy Services, LLC; Exhibit V U.S. Pat. No. 10,844,697 vs EWAPS; dated Aug. 30, 2021; 17 pages.
GR Energy Operating GP LLC, GR Energy Services Management, LP and GR Energy Services, LLC; Exhibit W U.S. Pat. No. 10,844,697 vs SafeJet System; dated Aug. 30, 2021; 17 pages.
GR Energy Operating GP LLC, GR Energy Services Management, LP and GR Energy Services, LLC; GR Energy's Preliminary Invalidity Contentions for Civil Action No. 6:21-cv-00085-ADA; dated Aug. 30, 2021; 18 pages.
Heard, Preston; Declaration for PGR2021-00078; dated Aug. 19, 2021; 5 pages.
Horizontal Wireline Services, LLC and Allied Wireline Services, LLC; Defendants' Preliminary Invalidity Contentions for Civil Action No. 6:21-cv-00349-ADA; dated Aug. 30, 2021; 22 pages.
Horizontal Wireline Services, LLC and Allied Wireline Services, LLC; Exhibit A1 U.S. Pat. No. 5,155,293 to Barton vs. Asserted Claims of U.S. Pat. No. 10,844,697; dated Aug. 30, 2021; 21 pages.
Horizontal Wireline Services, LLC and Allied Wireline Services, LLC; Exhibit A10 U.S. Publication No. 8,869,887 to Deere, et al. vs. Asserted Claims of U.S. Pat. No. 10,844,697; dated Aug. 30, 2021; 10 pages.
Horizontal Wireline Services, LLC and Allied Wireline Services, LLC; Exhibit A11 U.S. Pat. No. 4,457,383 to Boop vs. Asserted Claims of U.S. Pat. No. 10,844,697; dated Aug. 30, 2021; 22 pages.
Horizontal Wireline Services, LLC and Allied Wireline Services, LLC; Exhibit A12 U.S. Patent Application Pub. No. 2012/0247771 to Black, et al. vs. Asserted Claims of U.S. Pat. No. 10,844,697; dated Aug. 30, 2021; 26 pages.
Horizontal Wireline Services, LLC and Allied Wireline Services, LLC; Exhibit A13 U.S. Publication No. 2016/0084048 to Harrigan, et al. vs. Asserted Claims of U.S. Pat. No. 10,844,697; dated Aug. 30, 2021; 14 pages.
Horizontal Wireline Services, LLC and Allied Wireline Services, LLC; Exhibit A14 U.S. Patent Application No. 2010/0065302 to Nesbitt vs. Asserted Claims of U.S. Pat. No. 10,844,697; dated Aug. 30, 2021; 15 pages.
Horizontal Wireline Services, LLC and Allied Wireline Services, LLC; Exhibit A15 U.S. Pat. No. 3,173,992 to Boop vs. Asserted Claims of U.S. Pat. No. 10,844,697; dated Aug. 30, 2021; 17 pages.
Horizontal Wireline Services, LLC and Allied Wireline Services, LLC; Exhibit A16 U.S. Pat. No. 6,506,083 to Bickford, et al. vs. Asserted Claims of U.S. Pat. No. 10,844,697; dated Aug. 30, 2021; 17 pages.
Horizontal Wireline Services, LLC and Allied Wireline Services, LLC; Exhibit A17 U.S. Pat. No. 8,387,533 to Runkel vs. Asserted Claims of U.S. Pat. No. 10,844,697; dated Aug. 30, 2021; 16 pages.
Horizontal Wireline Services, LLC and Allied Wireline Services, LLC; Exhibit A18 U.S. Pat. No. 8,943,943 to Tassaroli vs. Asserted Claims of U.S. Pat. No. 10,844,697; dated Aug. 30, 2021; 7 pages.
Horizontal Wireline Services, LLC and Allied Wireline Services, LLC; Exhibit A19 U.S. Pat. No. 7,762,331 to Goodman. vs. Asserted Claims of U.S. Pat. No. 10,844,697; dated Aug. 30, 2021; 28 pages.
Horizontal Wireline Services, LLC and Allied Wireline Services, LLC; Exhibit A2 U.S. Pat. No. 6,582,251 to Burke, et al. vs. Asserted Claims of U.S. Pat. No. 10,844,697; dated Aug. 30, 2021; 15 pages.
Brinsden, Mark; Declaration of Mark Brinsden; dated Sep. 30, 2021; 51 pages.
Canadian Intellectual Property Office; Office Action for CA Application No. 3,070,118; dated Nov. 17, 2021; 3 pages.

(56) References Cited

OTHER PUBLICATIONS

Dynaenergetics Europe GMBH; Reply Under 37 C.F.R. §1.111 Amendment Under 37 C.F.R. §1.121 for U.S. Appl. No. 16/585,790; dated Feb. 20, 2020; 18 pages.
Dynaenergetics Europe, GMBH; Patent Owner's Preliminary Response for PGR No. 2021-00097; dated Oct. 29, 2021; 110 pages.
Fayard, Alfredo; Declaration of Alfredo Fayard; dated Oct. 18, 2021; 13 pages.
G&H Diversified Manufacturing, LP; Defendant G&H Diversified Manufacturing, LP's Opening Claim Construction Brief; dated Oct. 18, 2021; 25 pages.
GR Energy Services Operating Gp Llc, Gr Energy Services Management, LP and GR Energy Services, LLC; GR Energy's Opening Claim Construction Brief; dated Oct. 18, 2021; 23 pages.
Horizontal Wireline Services, LLC and Allied Wireline Services, LLC; Defendants' Opening Claim Construction Brief; dated Oct. 18, 2021; 27 pages.
Hunting Titan, Inc.; Defendant's Supplemental Brief on Claim Construction; dated Nov. 5, 2021; 9 pages.
International Searching Authority; International Search Report and Written Opinion for International Application No. PCT/US2020/032879; dated Aug. 20, 2020; 9 pages.
Meehan, Nathan; Declaration of D. Nathan Meehan, Ph.D, P.E; dated Oct. 18, 2021; 86 pages.
Nextier Completion Solutions Inc.; Defendant NexTier Completion Solution Inc.'s Opening Claim Construction Brief; dated Oct. 18, 2021; 26 pages.
Nexus Perforating LLC; Nexus Perforating LLC's Responsive Claim Construction Brief for Civil Action No. 4:21-cv-00280; dated Nov. 3, 2021; 31 pages.
Norwegian Industrial Property Office; Office Action for No. U.S. Appl. No. 20/210,799; dated Oct. 30, 2021; 2 pages.
Patent Trial and Appeals Board; Decision Granting Institution of Post Grant Review, PGR No. PGR2021-00097; dated Jan. 6, 2022; 92 pages.
Perfx Wireline Services, LLC; Defendant PerfX Wireline Services, LLC's Opening Claim Construction Brief; dated Oct. 18, 2021; 23 pages.
Promperforator LLC, Perforating Systems Design and Manufacturing, 2014, 36 pgs., http://www.promperforator.ru/upload/file/katalog_eng_2014.pdf.
Rodgers, John; Declaration of John Rodgers, Ph.D for PGR Case No. PGR2021-00097; dated Oct. 28, 2021; 124 pages.
Rodgers, John; Videotaped Deposition of John Rodgers; dated Jul. 29, 2021; 49 pages.
Schlumberger; Lina Pradilla, Wireline Efficiency in Unconventional Plays—The Argentinean Experience, including excerpted image from slide 13; dated 2013; 16 pages http://www.perforators.org/wp-content/uploads/2015/10/SLAP_47_Wireline_Efficiency_Unconventional_Plays.pdf.
Shelby Sullivan; Declaration of Shelby Sullivan; dated Oct. 18, 2021; 9 pages.
SWM International, LLC and Nextier Completion Solutions LLC; Petitioner's Preliminary Reply To Patent Owner's Preliminary Response for Case No. PGR2021-00097; dated Nov. 15, 2021; 11 pages.
United States Patent and Trademark Office; Decision Granting Institution of Post-Grant Review 35 U.S.C. §324 for PGR2021-00078; dated Nov. 1, 2021; 87 pages.
United States Patent and Trademark Office; Final Office Action for U.S. Appl. No. 16/809,729; dated Nov. 18, 2021; 16 pages.
United States Patent and Trademark Office; Information Disclosure Statement for U.S. Appl. No. 16/293,508; dated Dec. 10, 2020; 7 pages.
United States Patent and Trademark Office; Non-Final Office Action for U.S. Appl. No. 16/809,729; dated Feb. 3, 2022; 6 pages.
United States Patent and Trademark Office; Non-Final Office Action for U.S. Appl. No. 17/352,728; dated Oct. 25, 2021; 9 pages.
United States Patent and Trademark Office; Notice of Allowance for U.S. Appl. No. 17/221,219; dated Jan. 13, 2022; 11 pages.
United States Patent and Trademark Office; Notices of Allowabilty for U.S. Appl. No. 16/585,790; dated Jul. 31, 2020 and Mar. 18, 2020; Response to Office Action for U.S. Appl. No. 16/585,790; dated Nov. 12, 2019; 26 pages.
United States Patent and Trademark Office; Office Action and Response to Office Action for U.S. Appl. No. 16/585,790; dated Nov. 12, 2019 and Feb. 12, 2020; 21 pages.
United States Patent and Trademark Office; Office Action in Ex Parte Reexamination for U.S. Pat. No. 10,844,697; mailed Jan. 26, 2022; 10 pages.
United States Patent and Trademark Office; Order Granting Request for Ex Parte Reexamination; dated Nov. 1, 2021; 14 pages.
Williams, John; Declaration of Dr. John Williams; dated Oct. 18, 2021; 9 pages.
Wooley, Gary; Declaration of Gary E. Wooley for Civil Action Nos. 6:20-cv-01110-ADA and 6:20-CV-01201-ADA; dated Oct. 18, 2021; 12 pages.
Wooley, Gary; Declaration of Gary R. Wooley for Civil Action No. 3:20-cv-00376; dated Jul. 8, 2021; 11 pages.
Wooley, Gary; Declaration of Gary R. Wooley for Civil Action No. 3:21-cv-00192-M; dated Aug. 17, 2021; 18 pages.
Wooley, Gary; Transcript of Gary Wooley for Civil Action No. 3:21-cv-00192-M; dated Sep. 2, 2021; 26 pages.
Canadian Intellectual Property Office; Notice of Allowance for CA Application No. 2,941,648; dated Feb. 2, 2022; 1 page.
G&H Diversified Manufacturing, LP; Petitioner's Oral Argument Presentation for PGR No. PGR2021-00078; dated Jul. 26, 2022; 65 pages.
Hunting Titan, Inc.; Defendant Hunting Titan, Inc.'s Opposition to Plaintiff's Motion for Summary Judgement for Civil Action No. 4:20-cv-02123; dated Mar. 30, 2022; 37 pages.
Hunting Titan, Inc.; Defendant Hunting Titan, Inc.'s Opposed Motion for Leave to Amend Invalidity Contentions for Civil Action No. 4:20-cv-02123; dated Nov. 19, 2021; 17 pages.
Hunting Titan, Inc.; Defendant's Final Invalidity Contentions for Civil Action No. 4:20-cv-02123; dated Jan. 7, 2022; 54 pages.
Hunting Titan, Inc.; Defendant's Preliminary Invalidity Contentions for Civil Action No. 4:20-cv-02123; dated Aug. 6, 2021; 52 pages.
Hunting Titan, Inc.; Exhibit 1 to Defendant Hunting Titan, Inc.'s Opposed Motion for Leave to Amend Invalidity Contentions for Civil Action No. 4:20-cv-02123; dated Nov. 19, 2021; 64 pages.
Hunting Titan, Inc.; Exhibit 2 to Defendant Hunting Titan, Inc.'s Opposed Motion for Leave to Amend Invalidity Contentions for Civil Action No. 4:20-cv-02123; dated Nov. 19, 2021; 33 pages.
Hunting Titan, Inc.; Exhibit 3 to Defendant Hunting Titan, Inc.'s Opposed Motion for Leave to Amend Invalidity Contentions for Civil Action No. 4:20-cv-02123; dated Nov. 19, 2021; 24 pages.
Hunting Titan, Inc.; Exhibit 4 to Defendant Hunting Titan, Inc.'s Opposed Motion for Leave to Amend Invalidity Contentions for Civil Action No. 4:20-cv-02123; dated Nov. 19, 2021; 9 pages.
Hunting Titan, Inc.; Exhibit 5 to Defendant Hunting Titan, Inc.'s Opposed Motion for Leave to Amend Invalidity Contentions for Civil Action No. 4:20-cv-02123; dated Nov. 19, 2021; 5 pages.
Hunting Titan, Inc.; Exhibit 6 to Defendant Hunting Titan, Inc.'s Opposed Motion for Leave to Amend Invalidity Contentions for Civil Action No. 4:20-cv-02123; dated Nov. 19, 2021; 4 pages.
Hunting Titan, Inc.; Exhibit 7 to Defendant Hunting Titan, Inc.'s Opposed Motion for Leave to Amend Invalidity Contentions for Civil Action No. 4:20-cv-02123; dated Nov. 19, 2021; 6 pages.
Hunting Titan, Inc.; Exhibit A to Defendant's Preliminary Invalidity Contentions, Invalidity of U.S. Pat. No. 10,429,161; dated Aug. 6, 2021; 93 pages.
Hunting Titan, Inc.; Exhibit B to Defendant's Preliminary Invalidity Contentions, Invalidity of U.S. Pat. No. 10,472,938; dated Aug. 6, 2021; 165 pages.
Hunting Titan, Inc.; Exhibit C to Defendant's Final Invalidity Contentions, Invalidity of U.S. Patent No. 10,429, 161; dated Jan. 7, 2022; 3 pages.
Hunting Titan, Inc.; Exhibit D to Defendant's Final Invalidity Contentions, Invalidity of U.S. Pat. No. 10,472,938; dated Jan. 7, 2022; 6 pages.
INPI Argentina; Office Action for Application No. 20190101834; dated Aug. 22, 2022; 3 pages.

(56) References Cited

OTHER PUBLICATIONS

INPI Argentina; Office Action for Application No. 20190101835; dated Aug. 29, 2022; 3 pages.
Norwegian Industrial Property Office; Office Action for No. U.S. Appl. No. 20/180,507; dated Sep. 29, 2022; 2 pages.
United States District Court for the Northern District of Texas Dallas Division; Memorandum Opinion and Order in Civil Action No. 3:21-cv-00192-M; Mar. 23, 2022; 34 pages (order is redacted to protect confidential information; redacted order has not yet been filed by the Court).
United States District Court for the Northern District of Texas Dallas Division; Memorandum Opinion and Order in Civil Action No. 3:21-cv-00188-M; Mar. 23, 2022; 35 pages (order is redacted to protect confidential information; redacted order has not yet been filed by the Court).
United States Patent and Trademark Office; Ex Parte Quayle Action for U.S. Appl. No. 16/809,729; dated Jun. 20, 2022; 4 pages.
United States Patent and Trademark Office; Ex Parte Quayle Action for U.S. Appl. No. 17/352,728; dated Jun. 20, 2022; 6 pages.
United States Patent and Trademark Office; Final Office Action for U.S. Appl. No. 16/540,484; dated Apr. 27, 2022; 12 pages.
United States Patent and Trademark Office; Final Office Action for U.S. Appl. No. 17/352,728; dated Mar. 9, 2022; 9 pages.
United States Patent and Trademark Office; Non-Final Office Action for U.S. Appl. No. 17/007,574; dated May 6, 2022; 10 pages.
United States Patent and Trademark Office; Non-Final Office Action for U.S. Appl. No. 17/221,219; dated Aug. 3, 2022; 8 pages.
United States Patent and Trademark Office; Notice of Allowance for U.S. Appl. No. 16/809,729; dated Sep. 21, 2022; 7 pages.
United States Patent and Trademark Office; Notice of Allowance for U.S. Appl. No. 17/007,574; dated Sep. 26, 2022; 8 pages.
United States Patent and Trademark Office; Notice of Allowance for U.S. Appl. No. 17/352,728; dated Sep. 21, 2022; 8 pages.
Dynaenergetics Europe GMBH; Patent Owner's Preliminary Response for PGR2020-00072; dated Oct. 23, 2020; 108 pages.
Dynaenergetics Europe GMBH; Patent Owner's Preliminary Response for PGR2020-00080; dated Nov. 18, 2020; 119 pages.
Dynaenergetics Europe; Complaint and Demand for Jury Trial, Civil Action No. 6:20-cv-1110; dated Dec. 4, 2020; 15 pages.
Dynaenergetics Europe; DynaEnergetics Celebrates Grand Opening of DynaStage Manufacturing and Assembly Facilities in Blum, Texas; dated Nov. 16, 2018; 3 pages.
Dynaenergetics Europe; DynaEnergetics exhibition and product briefing; 2013; 15 pages.
Dynaenergetics Europe; DynaStage Gun System; May 2014; 2 pages.
Hunting Titan Inc.; Petition for Post Grant Review of U.S. Pat. No. 10,472,938; dated Aug. 12, 2020; 198 pages.
Hunting Titan; ControlFire RF-Safe Assembly Gun Loading Manual; 33 pages.
Hunting Titan; ControlFire User Manual; 2014; 56 pages.
International Searching Authority; International Preliminary Report on Patentability for International Application No. PCT/IB2019/000537; dated Dec. 10, 2020; 11 pages.
International Searching Authority; International Preliminary Report on Patentability for International Application No. PCT/IB2019/000526; dated Dec. 10, 2020; 10 pages.
International Searching Authority; International Preliminary Report on Patentability International Application No. PCT/EP2019/063966; dated Dec. 10, 2020; 7 pages.
Norwegian Industrial Property Office; Office Action for No. U.S. Appl. No. 20/171,759; mailed Oct. 30, 2020; 2 pages.
Patent Trial and Appeal Board; Decision Granting Patent Owner's Request for Rehearing and Motion to Amend for IPR2018-00600; dated Jul. 6, 2020; 27 pages.
Preiss Frank et al.; Lowering Total Cost of Operations Through Higher Perforating Efficiency while simultaneously enhancing safety; 26 pages.
Rodgers, John; Declaration for PGR2020-00072; dated Oct. 23, 2020; 116 pages.
Rodgers, John; Declaration for PGR2020-00080; dated Nov. 18, 2020; 142 pages.
Salt Warren et al.; New Perforating Gun System Increases Safety and Efficiency; dated Apr. 1, 2016; 11 pages.
Scharf Thilo; Declaration for PGR2020-00080; dated Nov. 16, 2020; 16 pages.
Scharf, Thilo; Declaration for PGR2020-00072; dated Oct. 22, 2020; 13 pages.
Sharma, Gaurav; Hunting Plc Is Not In A Race To The Bottom, Says Oilfield Services Firm's CEO; dated Sep. 10, 2019; retrieved on Nov. 18, 2020; 6 pages.
Spears & Associates; Global Wireline Market; dated Oct. 15, 2019; 143 pages.
Stifel; Why the Big Pause? Balancing Long-Term Value with Near-Term Headwinds. Initiating Coverage of Oilfield Svcs and Equipment; dated Sep. 10, 2018; 207 pages.
United States Patent and Trademark Office; Final Office Action of U.S. Appl. No. 16/809,729, dated Nov. 3, 2020; 19 pages.
United States Patent and Trademark Office; Non-Final Office Action of U.S. Appl. No. 15/920,800; dated Dec. 9, 2020; 6 pages.
United States Patent and Trademark Office; Notice of Allowance for U.S. Appl. No. 29/733,080; Oct. 20, 2020; 9 pages.
United States Patent and Trademark Office; Restriction Requirement for U.S. Appl. No. 17/007,574; dated Oct. 23, 2020; 6 pages.
World Oil; DynaEnergetics expands DynaStage factory-assembled, well perforating systems; dated Mar. 14, 2017; 2 pages.
Dynaenergetics, Selection Perforating Switch, Product Information Sheet, May 27, 2011, 1 pg.
Dynaenergetics, Electronic Top Fire Detonator, Product Information Sheet, Jul. 30, 2013 1 pg.
German Patent Office, Office Action dated May 22, 2014, in German: See Office Action for German Patent Application No. 10 2013 109 227.6, which is in the same family as PCT Application No. PCT/EP2014/065752, 8 pgs.
PCT Search Report and Written Opinion, mailed May 4, 2015: See Search Report and Written opinion for PCT Application No. PCT/EP2014/065752, 12 pgs.
SIPO, Search Report dated Mar. 29, 2017, in Chinese: See Search Report for CN App. No. 201480040456.9, which is in the same family as PCT App. No. PCT/CA2014/050673, 12 & 3 pgs.
Jim Gilliat/Kaled Gasmi, New Select-Fire System, Baker Hughes, Presentation—2013 Asia-Pacific Perforating Symposium, Apr. 29, 2013, 16 pgs., http://www.perforators.org/presentations.php.
Dynaenergetics, DYNAselect Electronic Detonator 0015 SFDE RDX 1.4S, Product Information, Dec. 16, 2011, 1 pg.
Dynaenergetics, DYNAselect Electronic Detonator 0015 SFDE RDX 1.4B, Product Information, Dec. 16, 2011, 1 pg.
United States Patent and Trademark Office; Non-Final Office Action for U.S. Appl. No. 15/920,812; dated Feb. 3, 2021; 5 pages.
Babu et al., Programmable Electronic Delay Device for Detonator, Defence Science Journal, May 2013, 3 pages, vol. 63, No. 3, https://doaj.org/article/848a537b12ae4a8b835391bec9.
Intellectual Property India; First Examination Report for IN Application No. 201947035642; dated Nov. 27, 2020; 5 pages.
Norwegian Industrial Property Office; Notice of Allowance for NO Application No. 20171759; dated Apr. 23, 2021; 2 pages.
Owen Oil Tools; CoreLab Safe Ignition System Owen Det Bodies; dated 2015; 12 pages.
United States Patent and Trademark Office; Advisory Action Before the Filing of an Appeal Brief for U.S. Appl. No. 16/540,484; mailed on May 19, 2021; 3 pages.
United States Patent and Trademark Office; Non-Final Office Action for U.S. Appl. No. 16/809,729; dated Jun. 22, 2021; 15 pages.
United States Patent and Trademark Office; Non-Final Office Action for U.S. Appl. No. 17/221,219; dated Jun. 17, 2021; 10 pages.
United States Patent and Trademark Office; Notice of Allowance for U.S. Appl. No. 17/007,574; dated May 21, 2021; 8 pages.
United States District Court for the Southern District of Texas Houston Division, Case 4:19-cv-01611 for U.S. Pat. No. 9,581,422B2, Plaintiffs' Motion to Dismiss and Exhibits, dated Jun. 17, 2019, 63 pgs.

(56) References Cited

OTHER PUBLICATIONS

United States Patent and Trademark Office, Case IPR2018-00600 for U.S. Pat. No. 9,581,422 B2, Reply In Support of Patent Owner's Motion to Amend, dated Mar. 21, 2019, 15 pgs.
United States Patent and Trademark Office, Case IPR2018-00600 for U.S. Pat. No. 9,581,422 B2, DynaEnergetics GmbH & Co. KG's Patent Owner Preliminary Response, dated May 22, 2018, 47 pgs.
United States Patent and Trademark Office, Case IPR2018-00600 for U.S. Pat. No. 9,581,422 B2, Order Granting Precedential Opinion Panel, Paper No. 46, dated Nov. 7, 2019, 4 pgs.
United States Patent and Trademark Office, Case IPR2018-00600 for U.S. Pat. No. 9,581,422 B2, Patent Owner's Decision, Granting Patent Owner's Request for Hearing and Granting Patent Owner's Motion to Amend, dated Jul. 6, 2020, 27 pgs.
United States Patent and Trademark Office, Case IPR2018-00600 for U.S. Pat. No. 9,581,422 B2, Patent Owner's Opening Submission to Precedential Opinion Panel, dated Dec. 20, 2019, 21 pgs.
United States Patent and Trademark Office, Case IPR2018-00600 for U.S. Pat. No. 9,581,422 B2, Patent Owner's Request for Hearing, dated Sep. 18, 2019, 19 pgs.
United States Patent and Trademark Office, Case IPR2018-00600 for U.S. Pat. No. 9,581,422 B2, Patent Owner's Responsive Submission to Precedential Opinion Panel, dated Jan. 6, 2020, 16 pgs.
United States Patent and Trademark Office, Case IPR2018-00600 for U.S. Pat. No. 9,581,422 B2, Patent Owner's Sur-reply, dated Mar. 21, 2019, 28 pgs.
United States Patent and Trademark Office, Case IPR2018-00600 for U.S. Pat. No. 9,581,422 B2, Petitioner's Additional Briefing to the Precedential Opinion Panel, dated Dec. 20, 2019, 23 pgs.
United States Patent and Trademark Office, Case IPR2018-00600 for U.S. Pat. No. 9,581,422 B2, Petitioner's Opposition to Patent Owner's Motion to Amend, dated Mar. 7, 2019, 30 pgs.
United States Patent and Trademark Office, Case IPR2018-00600 for U.S. Pat. No. 9,581,422 B2, Petitioner's Reply Briefing to the Precedential Opinion Panel, dated Jan. 6, 2020, 17 pgs.
United States Patent and Trademark Office, Case IPR2018-00600 for U.S. Pat. No. 9,581,422 B2, Petitioner's Reply in Inter Partes Review of Patent No. 9,581,422, dated Mar. 7, 2019, 44 pgs.
United States Patent and Trademark Office, Case PGR 2020-00072 for U.S. Patent No. 10,429, 161 B2, Petition for Post Grant Review of Claims 1-20 of U.S. Patent No. 10,429, 161 Under 35 U.S.C. §§ 321-28 and 37 C.F. R. §§42.200 Et Seq., dated Jun. 30, 2020, 109 pages.
United States Patent and Trademark Office, Office Action of U.S. Appl. No. 15/117,228, dated May 31, 2018, 9 pgs.
United States Patent and Trademark Office, Office Action of U.S. Appl. No. 15/617,344, dated Jan. 23, 2019, 5 pgs.
United States Patent and Trademark Office, Office Action of U.S. Appl. No. 15/788,367, dated Oct. 22, 2018, 6 pgs.
United States Patent and Trademark Office, Office Action of U.S. Appl. No. 15/920,800, dated Dec. 27, 2019, 6 pgs.
United States Patent and Trademark Office, Office Action of U.S. Appl. No. 15/920,812, dated Dec. 27, 2019, 6 pgs.
United States Patent and Trademark Office, Office Action of U.S. Appl. No. 15/920,812, dated May 27, 2020, 5 pgs.
United States Patent and Trademark Office, Office Action of U.S. Appl. No. 16/026,431, dated Jul. 30, 2019, 10 pgs.
United States Patent and Trademark Office, Office Action of U.S. Appl. No. 16/359,540, dated Aug. 14, 2019, 9 pgs.
United States Patent and Trademark Office, Office Action of U.S. Appl. No. 16/359,540, dated May 3, 2019, 11 pgs.
United States Patent and Trademark Office, Office Action of U.S. Appl. No. 16/540,484, dated Oct. 4, 2019, 12 pgs.
United States Patent and Trademark Office, Office Action of U.S. Appl. No. 16/809,729, dated Jun. 19, 2020, 9 pgs.
United States Patent and Trademark Office, Office Action of U.S. Appl. No. 29/733,080, dated Jun. 26, 2020, 8 pgs.
United States Patent and Trademark Office; Final Office Action of U.S. Appl. No. 16/540,484; dated Mar. 30, 2020; 12 pgs.
United States Patent and Trademark Office; Notice of Allowance for U.S. Appl. No. 16/387,696; issued on Jan. 29, 2020; 7 pages.
United States Patent and Trademark Office; Notice of Allowance for U.S. Appl. No. 15/920,800; dated July, 7 2020; 7 pages.
USPTO; Notice of Allowance for U.S. Appl. No. 14/904,788; mailed Jul. 6, 2016; 8 pages.
USPTO; Supplemental Notice of Allowability for U.S. Appl. No. 14/904,788; mailed Jul. 21, 2016; 2 pages.
Albert, Larry et al.; New Perforating Switch Technology Advances Safety & Reliability for Horizontal Completions; Unconventional Resources Tech. Conference; Jul. 20-22, 2015; 7 pgs.
Bear Manufacturing, LLC; Defendant's Preliminary Invalidity Contentions; dated Aug. 4, 2021; 23 pages.
drillingmatters.org; Definition of "sub"; dated Aug. 25, 2018; 2 pages.
Markel, Dan; Declaration regarding the SafeJet System for PGR2021-00097; dated Jul. 15, 2021; 21 pages.
New Oxford American Dictionary Third Edition; Definition of "end"; dated 2010; 3 pages.
Oilfield Glossary; Definition of Perforating Gun; dated Feb. 26, 2013; 2 pages.
oilgasglossary.com; Definition of "sub"; dated Nov. 20, 2008; 1 page.
Olsen, Steve; Declaration regarding the SafeJet System for PGR2021-00097; dated Jul. 16, 2021; 25 pages.
Oso Perforating, LLC; Defendant's Preliminary Invalidity Contentions for Civil Action No. 3:21-cv-00188-M; dated Aug. 4, 2021; 23 pages.
Oso Perforating, LLC; Exhibit A1 U.S. Patent No. 5, 155,293 to Barton vs. Asserted Claims of U.S. Pat. No. 10,844,697; dated Aug. 4, 2021; 21 pages.
Oso Perforating, LLC; Exhibit A10 U.S. Pat. No. 8,869,887 to Deere, et al. vs. Asserted Claims of U.S. Pat. No. 10,844,697; dated Aug. 4, 2021; 10 pages.
Oso Perforating, LLC; Exhibit A11 U.S. Pat. No. 4,457,383 to Boop. vs. Asserted Claims of U.S. Pat. No. 10,844,697; dated Aug. 4, 2021; 22 pages.
Oso Perforating, LLC; Exhibit A12 U.S. Publication No. 2012/0247771 to Black, et al. vs. Asserted Claims of U. S. Patent No. 10,844,697; dated Aug. 4, 2021; 26 pages.
Oso Perforating, LLC; Exhibit A13 U.S. Publication No. 2016/0084048 to Harrigan, et al. vs. Asserted Claims of U.S. Pat. No. 10,844,697; dated Aug. 4, 2021; 14 pages.
Oso Perforating, LLC; Exhibit A14 U.S. Publication No. 2010/0065302 to Nesbitt vs. Asserted Claims of U.S. Pat. No. 10,844,697; dated Aug. 4, 2021; 15 pages.
Oso Perforating, LLC; Exhibit A15 U.S. Pat. No. 3,173,992 to Boop vs. Asserted Claims of U.S. Pat. No. 10,844,697; dated Aug. 4, 2021; 17 pages.
Oso Perforating, LLC; Exhibit A16 U.S. Pat. No. 6,506,083 to Bickford, et al. vs. Asserted Claims of U.S. Pat. No. 10,844,697; dated Aug. 4, 2021; 17 pages.
Oso Perforating, LLC; Exhibit A17 U.S. Pat. No. 8,387,533 to Runkel vs. Asserted Claims of U.S. Pat. No. 10,844,697; dated Aug. 4, 2021; 16 pages.
Oso Perforating, LLC; Exhibit A18 U.S. Pat. No. 8,943,943 to Tassaroli vs. Asserted Claims of U.S. Pat. No. 10,844,697; dated Aug. 4, 2021; 7 pages.
Oso Perforating, LLC; Exhibit A19 U.S. Pat. No. 7,762,331 to Goodman vs. Asserted Claims of U.S. Pat. No. 10,844,697; dated Aug. 4, 2021; 28 pages.
Oso Perforating, LLC; Exhibit A2 U.S. Pat. No. 6,582,251 to Burke, et al. vs. Asserted Claims of U.S. Pat. No. 10,844,697; dated Aug. 4, 2021; 15 pages.
Oso Perforating, LLC; Exhibit A20 U.S. Publication No. 2012/01999352 to Lanclos vs. Asserted Claims of U.S. Pat. No. 10,844,697; dated Aug. 4, 2021; 24 pages.
Oso Perforating, LLC; Exhibit A21 "3.12-in Frac Gun" Publication and 3.12-in Frac Gun System by Sclumberger vs. Asserted Claims of U.S. Pat. No. 10,844,697; dated Aug. 4, 2021; 26 pages.
Oso Perforating, LLC; Exhibit A23 Amit Govil, "Selective Perforation: A Game Changer in Perforating Technology—Case Study,"

(56) References Cited

OTHER PUBLICATIONS

2012 European and West African Perforating Symposium ("EWAPS") vs. Asserted Claims of U.S. Pat. No. 10,844,697; dated Aug. 4, 2021; 17 pages.
Oso Perforating, LLC; Exhibit A24 Schlumberger SafeJet System vs. Asserted Claims of U.S. Pat. No. 10,844,697; dated Aug. 4, 2021; 26 pages.
Oso Perforating, LLC; Exhibit A3 U.S. Pat. No. 7,901,247 to Ring vs. Asserted Claims of U.S. Pat. No. 10,844,697; dated Aug. 4, 2021; 19 pages.
Oso Perforating, LLC; Exhibit A4 U.S. Pat. No. 9,145,764 to Burton, et al. vs. Asserted Claims of U.S. Pat. No. 10,844,697; dated Aug. 4, 2021; 18 pages.
Oso Perforating, LLC; Exhibit A5 U.S. Pat. No. 9,175,553 to McCann, et al. vs. Asserted Claims of U.S. Pat. No. 10,844,697; dated Aug. 4, 2021; 26 pages.
Oso Perforating, LLC; Exhibit A6 U.S. Pat. No. 9,689,223 to Schacherer, et al. vs. Asserted Claims of U.S. Pat. No. 10,844,697; dated Aug. 4, 2021; 8 pages.
Oso Perforating, LLC; Exhibit A7 WO 2014/089194 to Rogman, et al vs. Asserted Claims of U.S. Pat. No. 10,844,697; dated Aug. 4, 2021; 16 pages.
Oso Perforating, LLC; Exhibit A8 U.S. Publication No. 2008/0073081 to Frazier, et al. vs. Asserted Claims of U.S. Patent No. 10,844,697; dated Aug. 4, 2021; 33 pages.
Oso Perforating, LLC; Exhibit A9 U.S. Pat. No. 9,065,201 to Borgfeld, et al. vs. Asserted Claims of U.S. Pat. No. 10,844,697; dated Aug. 4, 2021; 14 pages.
Perfx Wireline Services, LLC; PerfX Wireline Services, LLC's Preliminary Invalidity Contentions for Civil Action No. 1:20-CV-03665; dated Jul. 2, 2021; 4 pages.
Perfx Wireline Services, LLC; Invalidity Chart for U.S. Pat. No. 10,844,697 in view of the Dynawell Gun System Exhibit A; dated Jul. 2, 2021; 42 pages.
Perfx Wireline Services, LLC; Invalidity Chart for U.S. Pat. No. 10,844,697 in view of the LRI Gun System Exhibit B; dated Jul. 2, 2021; 33 pages.
Perfx Wireline Services, LLC; Invalidity Chart for U.S. Pat. No. 10,844,697 in view of the Owen Oil Tools System Exhibit C; dated Jul. 2, 2021; 64 pages.
Perfx Wireline Services, LLC; Invalidity Chart for U.S. Pat. No. 10,844,697 in view of the Select Fire System Exhibit D; dated Jul. 2, 2021; 49 pages.
Perfx Wireline Services, LLC; Invalidity Chart for U.S. Pat. No. 10,844,697 in view of U.S. Pat. No. 10,077,641 Exhibit H; dated Jul. 2, 2021; 41 pages.
Perfx Wireline Services, LLC; Invalidity Chart for U.S. Pat. No. 10,844,697 in view of U.S. Pat. No. 4,007,796 Exhibit F; dated Jul. 2, 2021; 40 pages.
Perfx Wireline Services, LLC; Invalidity Chart for U.S. Pat. No. 10,844,697 in view of U.S. Pat. No. 5,042,594 Exhibit E; dated Jul. 2, 2021; 38 pages.
Perfx Wireline Services, LLC; Invalidity Chart for U.S. Pat. No. 10,844,697 in view of U.S. Pat. No. 9,145,764 Exhibit G; dated Jul. 2, 2021; 58 pages.
Rodgers, John; Declaration for Civil Action No. 3:21-cv-00192-M; dated May 27, 2021; 42 pages.
Schlumberger; Field Test Database Print Out Showing uses of the SafeJet System; dated May 11, 2015; 10 pages.
SWM International, LLC and Nextier Oil Completion Solutions, LLC; Petition for Post Grant Review PGR No. 2021-00097; dated Jul. 20, 2021; 153 pages.
SWM International, LLC; Defendant's P.R. 3-3 and 3-4 Preliminary Invalidity Contentions; dated Aug. 4, 2021; 28 pages.
SWM International, LLC; Ex. A-1 Invalidity of U.S. Pat. No. 10,844,697 Over the SafeJet System; dated Aug. 4, 2021; 15 pages.
SWM International, LLC; Ex. A-1A Invalidity of U.S. Pat. No. 10,844,697 Over the SafeJet System in view of Backhus; dated Aug. 4, 2021; 4 pages.
SWM International, LLC; Ex. A-1B Invalidity of U.S. Pat. No. 10,844,697 Over the SafeJet System in view of Harrigan; dated Aug. 4, 2021; 3 pages.
SWM International, LLC; Ex. A-2 Invalidity of U.S. Pat. No. 10,844,697 Over Goodman; dated Aug. 4, 2021; 11 pages.
SWM International, LLC; Ex. A-2A Invalidity of U.S. Pat. No. 10,844,697 Over Goodman in view of Backhus; dated Aug. 4, 2021; 3 pages.
Dynaenergetics Europe; Complaint and Demand for Jury Trial, Civil Action No. 1:20-cv-03665; dated Dec. 15, 2020; 8 pages.
SWM International, LLC; Ex. A-2B Invalidity of U.S. Pat. No. 10,844,697 Over Goodman in view of Harrigan; dated Aug. 4, 2021; 3 pages.
SWM International, LLC; Ex. A-3 Invalidity of U.S. Pat. No. 10,844,697 Over Harrigan; dated Aug. 4, 2021; 13 pages.
SWM International, LLC; Ex. A-4 Invalidity of U.S. Pat. No. 10,844,697 Over Burton; dated Aug. 4, 2021; 11 pages.
SWM International, LLC; Ex. A-5 Invalidity of U.S. Pat. No. 10,844,697 Over Rogman; dated Aug. 4, 2021; 10 bages.
SWM International; Drawing of SafeJet System; dated Jul. 20, 2021; 1 page.
SWM International; Photographs of SafeJet System; dated Jul. 20, 2021; 9 pages.
United States Patent and Trademark Office; Non-Final Office Action for U.S. Appl. No. 16/540,484; dated Aug. 9, 2021; 12 pages.
United States Patent and Trademark Office; Notice of Allowance for U.S. Appl. No. 15/920,812; dated Aug. 4, 2021; 5 pages.
Wooley, Gary R.; Declaration in Support of Petition for Post Grant Review of U.S. Pat. No. 10,844,697 for PGR2021-00097; dated Jul. 17, 2021; 90 pages.
Intellectual Property India, Office Action of IN Application No. 201647004496, dated Jun. 7, 2019, 6 pgs.
U.S. Patent Trial and Appeal Board, Final Written Decision, Case IPR2018-00600 re U.S. Pat. No. 9,581,422, entered Aug. 20, 2019, 31 pages.
Perfx's Wireline Services, LLC; Exhibit B-3: Invalidity Chart for U.S. Patent No. D904,475 in view of the Owen Oil Tools Tandem Sub; dated Aug. 30, 2021; 10 pages.
Perfx's Wireline Services, LLC; Exhibit B-4: Invalidity Chart for U.S. Patent No. D904,475 in view of the XConnect Tandem Sub; dated Aug. 30, 2021; 1 page.
Perfx's Wireline Services, LLC; Exhibit B-5: Invalidity Chart for U.S. Patent No. D904,475 in view of the SafeJet Disposable Bulkhead; dated Aug. 30, 2021; 15 pages.
Perfx's Wireline Services, LLC; Exhibit B-6: Invalidity Chart for U.S. Patent No. D904,475 in view of Chinese Patent Application No. CN110424930A; dated Aug. 30, 2021; 9 pages.
Perfx's Wireline Services, LLC; Exhibit B-7: Invalidity Chart for U.S. Patent No. D904,475 in view of U.S. Patent Publication No. 2020/0308938; dated Aug. 30, 2021; 8 pages.
Perfx's Wireline Services, LLC; Xconnect, LLC's Preliminary Invalidity Contentions for Civil Action No. 6:21-cv-00371-ADA; dated Aug. 30, 2021; 7 pages.
Rodgers, John; Claim Construction Declaration for Civil Action No. 3:21-cv-00185; dated Sep. 28, 2021; 41 pages.
Rodgers, John; Claim Construction Declaration for Civil Action No. 3:21-cv-00188; dated Sep. 28, 2021; 42 pages.
Rodgers, John; Declaration for Civil Action No. 3:20-CV-00376; dated Jul. 8, 2021; 32 pages.
Rodgers, John; Declaration for PGR2021-00078; dated Aug. 19, 2021; 137 pages.
Salt, et al.; New Perforating Gun System Increases Saftey and Efficiency; Journal of Petroleum Technology; dated Apr. 1, 2016; Weatherford; https://jpt.spe.org/new-perforating-gun-system-increases-safety-and-efficiency; 11 pages.
SWM International, LLC; Defendant's P.R. 4-1 Disclosure of Proposed Terms and Claim Elements for Construction for Civil Action No. 3:21-cv-00192-M; dated Aug. 24, 2021; 5 pages.
Tolteq; iSeries MWD System; dated 2021; 9 pages.
United States District Court for the Southern District of Texas; Joint Claim Construction Statement for Civil Action No. 3:20-cv-00376; dated Jul. 8, 2021; 14 pages.

(56) References Cited

OTHER PUBLICATIONS

United States District Court for the Southern District of Texas; Joint Claim Construction Statement for Civil Action No. 4:20-cv-02123; dated Aug. 27, 2021; 14 pages.
United States District Court for the Western District of Texas; Order Granting in Part & Denying on Part Defendants' Motion to Dismiss for Improper Venue or to Transfer Venue Pursuant to 28 U.S.C. § 1404(a) for Civil Action No. 6:20-CV-01110-ADA; dated Aug. 5, 2021; 16 pages.
United States Patent and Trademark Office; Final Office Action for U.S. Appl. No. 17/221,219; dated Aug. 24, 2021; 14 pages.
United States Patent and Trademark Office; Patent Assignment for U.S. Appl. No. 61/733,129; dated Jan. 25, 2013; 2 pages.
United States Patent and Trademark Office; U.S. Provisional U.S. Appl. No. 61/739,592; dated Dec. 19, 2012; 65 pages.
United States Patent Trial and Appeal Board; Record of Oral Hearing held Feb. 18, 2020 for IPR dated 2018-00600; dated Feb. 18, 2020; 27 pages.
Wetechnologies; Downhole Connectors, High Pressure HP / HT & Medium Pressure MP /MT; dated Apr. 3, 2016; http://wetechnologies.com/products/hp-ht-downhole/; 3 pages.
Yellow Jacket Oil Tools, LLC; Defendant Yellow Jacket Oil Tools, LLC's Answer to Plaintiffs' First Amended Complaint for Civil Action No. 6:20-cv-01110; dated Aug. 10, 2021; 13 pages.
Yellowjacket Oil Tools, LLC and G&H Diversified Manufacturing, Lp; Defendants' Preliminary Invalidity Contentions for Civil Action No. 6:20-cv-01110-ADA; dated Aug. 30, 2021; 21 pages.
Yellowjacket Oil Tools, LLC and G&H Diversified Manufacturing, LP; Exhibit A-1 BakerHughes Select-Fire; dated Aug. 30, 2021; 33 pages.
Yellowjacket Oil Tools, LLC and G&H Diversified Manufacturing, LP; Exhibit A-10 U.S. Patent No. 7.762,331 to Goodman; dated Aug. 30, 2021; 4 pages.
Yellowjacket Oil Tools, LLC and G&H Diversified Manufacturing, LP; Exhibit A-11 U.S. Patent Publication No. 2016 0084048 A1 to Harrigan et al.; dated Aug. 30, 2021; 4 pages.
Yellowjacket Oil Tools, LLC and G&H Diversified Manufacturing, LP; Exhibit A-12 U.S. Appl. No. 61/819,196 to Harrigan et al.; dated Aug. 30, 2021; 26 pages.
Yellowjacket Oil Tools, LLC and G&H Diversified Manufacturing, LP; Exhibit A-13 U.S. Pat. No. 9,874,083 to Logan; dated Aug. 30, 2021; 18 pages.
Yellowjacket Oil Tools, LLC and G&H Diversified Manufacturing, LP; Exhibit A-14 New Select-Fire System; dated Aug. 30, 2021; 33 pages.
Yellowjacket Oil Tools, LLC and G&H Diversified Manufacturing, LP; Exhibit A-15 U.S. Pat. No. 10,077,641 to Rogman; dated Aug. 30, 2021; 36 pages.
Yellowjacket Oil Tools, LLC and G&H Diversified Manufacturing, LP; Exhibit A-16 U.S. Provisional Application No. 61/733,129 to Rogman; dated Aug. 30, 2021; 55 pages.
Yellowjacket Oil Tools, LLC and G&H Diversified Manufacturing, LP; Exhibit A-17 U.S. Pat. No. 8,387,533 to Runkel; dated Aug. 30, 2021; 5 pages.
Yellowjacket Oil Tools, LLC and G&H Diversified Manufacturing, LP; Exhibit A-18 Schlumberger SafeJet; dated Aug. 30, 2021; 13 pages.
Yellowjacket Oil Tools, LLC and G&H Diversified Manufacturing, LP; Exhibit A-19 U.S. Pat. No. 7,226,303 to Shaikh; dated Aug. 30, 2021; 4 pages.
Yellowjacket Oil Tools, LLC and G&H Diversified Manufacturing, LP; Exhibit A-2 U.S. Pat. No. 6,506,083 to Bickford et al.; dated Aug. 30, 2021; 3 pages.
Yellowjacket Oil Tools, LLC and G&H Diversified Manufacturing, LP; Exhibit A-20 U.S. Pat. No. 3,943,943 to Carlos Jose Tassaroli; dated Aug. 30, 2021; 7 pages.
Yellowjacket Oil Tools, LLC and G&H Diversified Manufacturing, LP; Exhibit A-3 U.S. Patent Pub. No. US 2012/0247771 A1 to Black et al.; dated Aug. 30, 2021; 30 pages.
Yellowjacket Oil Tools, LLC and G&H Diversified Manufacturing, LP; Exhibit A-4 U.S. Pat. No. 4,457,383 to Gene T. Boop; dated Aug. 30, 2021; 22 pages.
Yellowjacket Oil Tools, LLC and G&H Diversified Manufacturing, LP; Exhibit A-5 U.S. Pat. No. 3,173,229 to Gene T. Boop; dated Aug. 30, 2021; 12 pages.
Yellowjacket Oil Tools, LLC and G&H Diversified Manufacturing, LP; Exhibit A-6 U.S. Pat. No. 9,065,201 to Borgfeld et al.; dated Aug. 30, 2021; 3 pages.
Yellowjacket Oil Tools, LLC and G&H Diversified Manufacturing, LP; Exhibit A-7 U.S. Pat. No. 6,582,251 to Burke et al.; dated Aug. 30, 2021; 3 pages.
Yellowjacket Oil Tools, LLC and G&H Diversified Manufacturing, LP; Exhibit A-8 U.S. Patent Publication No. 2013/0126237 A1 to Burton; dated Aug. 30, 2021; 3 pages.
Yellowjacket Oil Tools, LLC and G&H Diversified Manufacturing, LP; Exhibit A-9 Selective perforation: A Game Changer in Peforating Technology—Case Study; dated Aug. 30, 2021; 13 pages.
Baumann et al.; Perforating Innovations—Shooting Holes in Performance Models; Oilfield Review, Autumn 2014, vol. 26, Issue No. 3 pp. 14-31; 18 pages.
C&J Energy Services; Gamechanger Perforating System Description; 2018; 1 pages.
C&J Energy Services; Gamechanger Perforating System Press Release; 2018; 4 pages.
CT Corporation System; Proof of Service of the Complaint; dated May 1, 2020; 39 pages.
Dynaenergetics Europe Gmbh; Principal and Response Brief of Cross-Appellant for United States Court of Appeals case No. 2020-2163, -2191; dated Jan. 11, 2021; 95 pages.
Dynaenergetics Europe; Complaint and Demand for Jury Trial, Civil Action No. 6:20-cv-01201; dated Dec. 30, 2020; 12 pages.
Dynaenergetics Europe; Plaintiffs' Pending Motion For Reconsideration for Civil Action No. 4:17-cv-03784; dated Jan. 21, 2021; 4 pages.
G&H Diversified Manufacturing, LP; Complaint for Declaratory Judgement for Civil Action No. 3:20-cv-00376; dated Dec. 14, 2020; 7 pages.
McBride Michael; Declaration for IPR2021-00082; dated Oct. 20, 2020; 3 pages.
Nextier Oilfield Solutions Inc; Petition for Inter Partes Review No. IPR2021-00082; dated Oct. 21, 2020; 111 pages.
Nexus Perforating LLC; Complaint and Demand for Jury Trial for Civil Case No. 4:20-cv-01539; dated Apr. 30, 2020; 11 pages.
Nexus Perforating; Double Nexus Connect (Thunder Gun System) Description; Retrieved from the internet Jan. 27, 2021; 6 pages.
Parrott, Robert; Declaration for IPR2021-00082; dated Oct. 20, 2020; 110 pages.
Smithson, Anthony; Declaration Declaration for IPR2021-00082; dated Oct. 16, 2020; 2 pages.
United States District Court Southern District of Texas Houston and Galveston Divisions; Seventh Supplemental Order; Sep. 17, 2020; 3 pages.
United States Patent and Trademark Office; Non-Final Office Action for U.S. Appl. No. 17/007,574; dated Jan. 29, 2021; 11 pages.
United States Patent and Trademark Office; Notice of Allowance for U.S. Appl. No. 16/809,729; dated Jan. 26, 2021; 9 pages.
United States Patent Trial and Appeal Board; Decision Denying Institution of Post-Grant Review; PGR No. 2020-00072; dated Jan. 19, 2021; 38 pages.
United States Patent and Trademark Office, Non-Final Office Action of U.S. Appl. No. 16/585,790, dated Nov. 12, 2019, which cites U.S. Pat. No. 9,677,363 to Schacherer et al., 9 pgs.
Baker Hughes; SurePerf Rapid Select-Fire System Perforate production zones in a single run; 2012; 2 pages.
Brazilian Patent and Trademark Office; Search Report for BR Application No. BR112015033010-0; mailed May 5, 2020; (4 pages).
Burndy, Bulkhead Ground Connector, Mechanical Summary Sheet, The Grounding Superstore, Jul. 15, 2014, 1 page, https://www.burndy.com/docs/default-source/cutsheets/bulkhead-connect.
Canadian Intellectual Property Office; Notice of Allowance for CA Appl. No. 2,821,506; mailed Jul. 31, 2019; 1 page.

(56) References Cited

OTHER PUBLICATIONS

Canadian Intellectual Property Office; Office Action for CA Appl. No. 2,821,506; mailed Mar. 21, 2019; 4 pages.
Dalia Abdallah et al., Casing Corrosion Measurement to Extend Asset Life, Dec. 31, 2013, 14 pgs., https://www.slb.com/-/media/files/oilfield-review/2-casing-corr-2-english.
Djresource, Replacing Signal and Ground Wire, May 1, 2007, 2 pages, http://www.djresource.eu/Topics/story/110/Technics-SL-Replacing-Signal-and-Ground-Wire/.
Dynaenergetics GmbH & Co. KG; Patent Owner's Precedential Opinion Panel Request for Case IPR2018-00600; Sep. 18, 2019, 2 pg.
Dynaenergetics; DynaStage Solution—Factory Assembled Performance-Assured Perforating Systems; 6 pages.
EP Patent Office—International Searching Authority, PCT Search Report and Written Opinion for PCT Application No. PCT/EP2014/065752, mailed May 4, 2015, 12 pgs.
Eric H. Findlay, Jury Trial Demand in Civil Action No. 6:20-cv-00069-ADA, dated Apr. 22, 2020, 32 pages.
European Patent Office; International Search Report and Written Opinion for PCT Application No. PCT/EP2014/065752 mailed May 4, 2015; 12 pgs.
European Patent Office; Invitation to Correct Deficiencies noted in the Written Opinion for European App. No. 15721178.0; issued Dec. 13, 2016; 2 pages.
European Patent Office; Office Action for EP App. No. 15721178.0; issued Sep. 6, 2018; 5 pages.
Federal Institute of Industrial Property; Decision of Granting for RU Appl. No. 2016104882/03(007851); May 17, 2018; 15 pages (English translation 4 pages).
Federal Institute of Industrial Property; Decision on Granting a Patent for Invention Russian App. No 2016139136/03(062394); issued Nov. 8, 2018; 20 pages (Eng Translation 4 pages); Concise Statement of Relevance: Search Report at 17-18 of Russian-language document lists several 'A' references based on RU application claims.
Federal Institute of Industrial Property; Inquiry for RU App. No. 2016104882/03(007851); dated Feb. 1, 2018; 7 pages, English Translation 4 pages.
Federal Institute of Industrial Property; Inquiry for RU Application No. 2016110014/03(015803); issued Feb. 1, 2018; 6 pages (Eng. Translation 4 pages).
GB Intellectual Property Office; Examination Report for GB Appl. No. 1717516.7; Apr. 13, 2018; 3 pages.
GB Intellectual Property Office; Notification of Grant for GB Appl. No. 1717516.7; Oct. 9, 2018; 2 pages.
GB Intellectual Property Office; Search Report for GB. Appl. No. 1700625.5; mailed Dec. 21, 2017; 5 pages.
Hunting Titan, Inc., U.S. Appl. No. 62/621,999 titled Cluster Gun System and filed Jan. 25, 2018, which is a priority application of International App. No. PCT/US2019/015255 published as WO2019/148009, Aug. 1, 2019, 7 pages, WIPO.
Hunting Titan, Inc., U.S. Appl. No. 62/627,591 titled Cluster Gun System and filed Feb. 7, 2018, which is a priority application of International App. No. PCT/US2019/015255 published as WO2019/148009, Aug. 1, 2019, 7 pages, WIPO.
Hunting Titan, Inc., U.S. Appl. No. 62/736,298 titled Starburst Cluster Gun and filed Sep. 25, 2018, which is a priority application of International App. No. PCT/US2019/015255 published as International Publication No. WO2019/148009, Aug. 1, 2019, 34 pages, WIPO.
Industrial Property Office, Czech Republic; Office Action for CZ App. No. PV 2017-675; Jul. 18, 2018; 2 bages; Concise Statement of Relevance: Examiner's objection of CZ application claims 1, 7, and 16 based on US Pub No. 20050194146 alone or in combination with WO Pub No. 2001059401.
Industrial Property Office, Czech Republic; Office Action for CZ App. No. PV 2017-675; Oct. 26, 2018; 2 pages.
Industrial Property Office, Czech Republic; Office Action; CZ App. No. PV 2017-675; Dec. 17, 2018; 2 pages.
Instituto Nacional De La Propiedad Industrial; Office Action for AR Appl. No. 20140102653; issued May 9, 2019 (1 page).
International Searching Authority, International Preliminary Report on Patentability for PCT App. No.PCT/EP2014/065752; Mar. 1, 2016, 10 pgs.
International Searching Authority; International Preliminary Report on Patentability for PCT Appl. No. PCT/CA2014/050673; issued Jan. 19, 2016; 5 pages.
International Searching Authority; International Search Report and Written Opinion for PCT App. No. PCT/EP2015/059381; Nov. 23, 2015; 14 pages.
Jet Research Centers, Capsule Gun Perforating Systems, Alvarado, Texas, 26 pgs., https://www.jetresearch.com/content/dam/jrc/Documents/Books_Catalogs/07_Cap_Gun.pdf.
Norwegian Industrial Property Office; Office Action and Search Report for NO App. No. 20171759; Jan. 14, 2020; 6 pages.
Norwegian Industrial Property Office; Office Action for NO Appl. No. 20160017; mailed Dec. 4, 2017; 2 pages.
Norwegian Industrial Property Office; Opinion for NO Appl. No. 20171759; mailed Apr. 5, 2019; 1 page.
Owen Oil Tools, E & B Select Fire Side Port, Tandem Sub, Apr. 2010, 2 pgs., https://www.corelab.com/owen/cms/docs/Canada/10A_eandbsystem-01.0-c.pdf.
Owen Oil Tools, Expendable Perforating Guns, Jul. 2008, 7 pgs., https://www.corelab.com/owen/cms/docs/Canada/10A_erhsc-01.0-c.pdf.
Owens Oil Tools, E & B Select Fire Side Port Tandem Sub Assembly, 2009, 9 pgs., https://www.corelab.com/owen/CMS/docs/Manuals/gunsys/MAN-30-XXX-0002-96-R00.pdf.
Robert Parrott, Case IPR2018-00600 for U.S. Pat. No. 9,581,422 B2, Declaration regarding Patent Invalidity, dated Jun. 29, 2020, 146 pages.
State Intellectual Property Office People's Republic of China; First Office Action for Chinese App. No. 201811156092.7; issued Jun. 16, 2020; 6 pages (Eng Translation 8 pages).
State Intellectual Property Office, P.R. China; First Office Action for CN App. No. 201480047092.7; Issued on Apr. 24, 2017.
State Intellectual Property Office, P.R. China; First Office Action with full translation for CN App. No. 201480040456.9; issued Mar. 29, 2017; 12 pages (English translation 17 pages).
State Intellectual Property Office, P.R. China; Notification to Grant Patent Right for Chinese App. No. 201580011132.7; issued Apr. 3, 2019; 2 pages (Eng. Translation 2 pages).
State Intellectual Property Office, P.R. China; Notification to Grant Patent Right for CN App. No. 201480040456.9; Jun. 12, 2018; 2 pages (English translation 2 pages).
State Intellectual Property Office, P.R. China; Second Office Action for CN App. No. 201480040456.9; Issued Nov. 29, 2017; 5 pages (English translation 1 page).
State Intellectual Property Office, P.R. China; Second Office Action for CN App. No. 201480047092.7; Issued Jan. 4, 2018; 3 pages.
UK Examination Report of United Kingdom Patent Application No. GB1600085.3, which is in the same family as U.S. Pat. No. 9,702,680 issued Jul. 11, 2017, mailed Mar. 9, 2016, 1 pg.
United States District Court for the Southern District of Texas Houston Division, Case 4:19-cv-01611 for U.S. Pat. No. 9,581,422B2, Plaintiff's Complaint and Exhibits, dated May 2, 2019, 26 pgs.
United States District Court for the Southern District of Texas Houston Division, Case 4:19-cv-01611 for U.S. Pat. No. 9,581,422B2, Defendant's Answers, Counterclaims and Exhibits, dated May 28, 2019, 135 pgs.
Corelab, RF-Safe Green Detonator, Data Sheet, Jul. 26, 2017, 2 pages.
Dynaenergetics Europe; Complaint and Demand for Jury Trial, Civil Action No. 6:20-cv-00069; dated Jan. 30, 2020; 9 pages.
Dynaenergetics Europe; Complaint and Demand for Jury Trial, Civil Action No. 4:17-cv-03784; dated Dec. 14, 2017; 7 pages.
Dynaenergetics Europe; Exhibit B Invalidity Claim Chart for Civil Action No. 4:19-cv-01611; dated May 2, 2019; 52 pages.
Dynaenergetics Europe; Exhibit C Invalidity Claim Chart for Civil Action No. 4:17-cv-03784; dated Jul. 13, 2020; 114 pages.

(56) References Cited

OTHER PUBLICATIONS

Dynaenergetics Europe; Plaintiffs' Local Patent Rule 3-1 Infringement Contentions for Civil Action No. 4:19- cv-01611; dated May 25, 2018; 10 Pages.
Dynaenergetics Europe; Plaintiffs' Motion to Dismiss Defendants' Counterclaim and to strike Affirmative Defenses, Civil Action No. 4:17-cv-03784; dated Feb. 20, 2018; 9 pages.
Dynaenergetics Europe; Plaintiffs' Preliminary Claim Constructions and Identification of Extrinsic Evidence Civil Action No. 4:17-cv-03784; dated Aug. 3, 2018; 9 pages.
Dynaenergetics Europe; Plaintiffs' Preliminary Infringement Contentions, Civil Action No. 6:20-cv-00069-ADA; dated Apr. 22, 2020; 32 pages.
Dynaenergetics Europe; Plaintiffs' Reply in Support of Motion to Dismiss and Strike for Civil Action No. 6:20-cv-00069-ADA; dated Apr. 29, 2020; 15 pages.
Dynaenergetics Europe; Plaintiffs Response to Defendant Hunting Titan Ins' Inoperative First Amended Answer, Affirmative Defenses, and Counterclaims for Civil Action No. 6:20-cv-00069-ADA; dated May 13, 2020.
Dynaenergetics Europe; Plaintiffs' Response to Defendants' Answer to Second Amended Complaint Civil Action No. 6:20-cv-00069-ADA; dated May 26, 2020; 18 pages.
Farinago, et al.; Long Gun Deployment Systems IPS-12-28; presented at International Perforating Symposium, Apr. 26-28, 2012; 11 pages.
GB Intellectual Property Office, Combined Search and Examination Report for GB App. No. 1717516.7, dated Feb. 27, 2018, 6 pgs.
GB Intellectual Property Office, Combined Search and Examination Report for GB App. No. GB1700625.5, dated Jul. 7, 2017, 5 pages.
Hunting Titan Ltd,; Defendants' Answer and Counterclaims, Civil Action No. 4:19-cv-01611, consolidated to Civil Action No. 4:17-cv-03784; dated May 28, 2019; 21 pages.
Hunting Titan Ltd.; Petition for Inter Partes Review of U.S. Pat. No. 9,581,422 Case No. IPR2018-00600; dated Feb. 16, 2018; 93 pages.
Hunting Titan Ltd.; Defendants' Answer and Counterclaims, Civil Action No. 6:20-cv-00069; dated Mar. 17, 2020; 30 pages.
Hunting Titan Ltd.; Defendants' Answer to First Amended Complaint and Counterclaims, Civil Action No. 6:20- cv-00069; dated Apr. 6, 2020; 30 pages.
Hunting Titan Ltd.; Defendants' Answer to Second Amended Complaint and Counterclaims, Civil Action No. 6:20- cv-00069; dated May 12, 2020; 81 pages.
Hunting Titan Ltd.; Defendants Invalidity Contentions Pursuant to Patent Rule 3-3, Civil Action No. 4:17-cv-03784; dated Jul. 6, 2018; 29 pages.
Hunting Titan Ltd.; Defendants' Objections and Responses to Plaintiffs' First Set of Interrogatories, Civil Action No. 4:17-cv-03784; dated Jun. 11, 2018.
Hunting Titan Ltd.; Defendants' Opposition to Plaintiffs' Motion to Dismiss and Strike Defendants' Amended Counterclaim and Affirmative Defenses for Unenforceability due to Inequitable Conduct for Civil Action No. 4:17-cv-03784; dated Apr. 24, 2018; 8 pages.
International Search Report and Written Opinion of International App. No. PCT/EP2020/058241, mailed Aug. 10, 2020, which is in the same family as U.S. Appl. No. 16/542,890, 18 pgs.
merriam-webster.com, Insulator Definition, https://www.merriam-webster.com/dictionary/insulator, Jan. 31, 2018, 4 pages.
Parrot, Robert; Declaration, PGR 2020-00080; dated Aug. 11, 2020; 400 pages.
Schlumberger; Selective Perforation: A Game Changer in Perforating Technology—Case Study; issued 2012; 14 pages.
Tom Smylie, New Safety Detonators for the Industry's consideration, presented at Explosives Safety & Security Conference, Feb. 23-24, 2005, 20 pages.
United States Patent and Trademark Office, Notice of Allowance for U.S. Appl. No. 16/585,790, mailed Jun. 19, 2020, 16 pgs.
United States Patent and Trademark Office, Provisional U.S. Appl. No. 61/733,129; filed Dec. 4, 2012; 10 pages.
United States Patent and Trademark Office, Provisional U.S. Appl. No. 61/819,196; filed May 3, 2013 ; 10 pages.
United States Patent and Trademark Office; Notice of Allowability for U.S. Appl. No. 14/908,788; dated Dec. 27, 2017; 5 pages.
United States Patent and Trademark Office; Notice of Allowance for U.S. Appl. No. 15/920,812, mailed Aug. 18, 2020; 5 pages.
United States Patent and Trademark Office; Notice of Allowance for U.S. Appl. No. 16/585,790, mailed on Aug. 5, 2020; 15 pages.
United States Patent and Trademark Office; Office Action of U.S. Appl. No. 16/540,484, dated Aug. 20, 2020, 10 pgs.
United States Patent and Trial Appeal Board; Final Written Decision on IPR2018-00600; issued Aug. 20, 2019; 31 pages.
USPTO, U.S. Pat. No. 438305A, issued on Oct. 14, 1890 to T.A. Edison, 2 pages.
WIPO, International Search Report for International Application No. PCT/CA2014/050673, mailed Oct. 9, 2014, 3 pgs.
WIPO, Written Opinion of International Searching Authority for PCT Application No. PCT/CA2014/050673, mailed Oct. 9, 2014, 4 pgs.
Austin Powder Company, A-140 F & Block, Detonator & Block Assembly, 2 pgs.
Owen Oil Tools & Pacific Scientific; Side Block for Side Initiation, 1 pg.
SIPO, Office Action dated Jun. 27, 2018: See Office Action for CN App. No. 201580011132.7, which is in the same family as PCT App. No. PCT/US2015/18906, 9 pgs. & 5 pgs.
Amit Govil, Selective Perforation: A Game Changer in Perforating Technology—Case Study, presented at the 2012 European and West African Perforating Symposium, Schlumberger, Nov. 7-9. 2012, 14 pgs.
Dynaenergetics, DYNAselect System, information downloaded from website, Jul. 3, 2013, 2 pgs., http://www.dynaenergetics.com/.
GB Intellectual Property Office, Search Report for App. No. GB 1700625.5, which is in the same family as U.S. Pat. No. 9,494,021, dated Jul. 7, 2017, 5 pgs.
International Search Report and Written Opinion of International Application No. PCT/US2015/018906, Jul. 10, 2015, 12 pgs.
Dynaenergetics, Gun Assembly, Products Summary Sheet, May 7, 2004, 1 pg.
GB Intellectual Property Office, Office Action dated Feb. 27, 2018, See Office Action for App. No. GB 1717516.7, which is the same family as PCT App. No. PCT/CA2014/050673, 6 pg.
Dynaenergetics, Selective Perforating Switch, information downloaded from website, Jul. 3, 2013, 2 pgs.,http://www.dynaenergetics.com/.
Hunting Titan, Wireline Top Fire Detonator Systems, Product Information Sheet, 1 pg.
Hunting Titan Inc., Petition for Inter Parties Review of U.S. Pat. No. 9581422, filed Feb. 16, 2018, 93 pgs.
Dynaenergetics GMBH & Co. KG, Patent Owner's Response to Hunting Titan's Petition for Inter Parties Review, filed Dec. 6, 2018, 73 pgs.
Dynaenergetics GMBH & Co. KG, Patent Owner's Motion to Amend, filed Dec. 6, 2018, 53 pgs.
U.S. Patent Trial and Appeal Board, Institution of Inter Partes Review, Case IPR2018-00600, issued on Aug. 21, 2018, 9 pgs.
International Written Opinion of International Application No. PCT/CA2014/050673, mailed Oct. 9, 2014, 4 pgs.
International Search Report of International Application No. PCT/CA2014/050673, mailed Oct. 9, 2014, 3 pgs.
UK Examination Report of United Kingdom Patent Application No. GB1600085.3, which is in the same family as U.S. Pat. 9,494,021, mailed Mar. 9, 2016, 1 pg.
Fiip, Search Report dated Feb. 1, 2018, in Russian: See Search Report for RU App. No. 2016104882/03, which is in the same family as PCT App. No. PCT/CA2014/050673, 7 pgs.
World Intellectual Property Office, Search Report for GB Patent App. No. GB1700625.5, which is in the same family as PCT App No. PCT/CA2014/050673, dated Jul. 7, 2017, 5 pages.
Norwegan Industrial Property Office, Office Action for NO U.S. Appl. No. 20/160,017, which is in the same family as PCT App No. PCT/CA2014/050673, dated Jun. 15, 2017, 3 pgs.

(56) References Cited

OTHER PUBLICATIONS

Jet Research Center Inc., Red RF Safe Detonators Brochure, 2008, 2 pgs., www.jetresearch.com.
Jet Research Center Inc., JRC Catalog, 36 pgs., www.jetresearch.com.
Horizontal Wireline Services, Presentation of a completion method of shale demonstrated through an example of Marcellus Shale, Pennsylvania, USA, Presented at 2012 International Perforating Symposium (Apr. 26-28, 2012), 17 pages.
Smylie, New Safe and Secure Detonators for the Industry's consideration, Presented at Explosives Safety & Security Conference Marathon Oil Co, Houston, Feb. 23-24, 2005, 20 pages.
Schlumberger, Combining and Customizing Technologies for Perforating Horizontal Wells in Algeria, Presented at 2011 MENAPS Middle East and North Africa Perforating Symposium, Nov. 28-30, 2011, 20 pages.
Baker Hughes, Long Gun Deployment Systems IPS-12-28, Presented at 2012 International Perforating Symposium, Apr. 26-28, 2011, 11 pages.
Owen Oil Tools, Recommended Practice for Oilfield Explosive Safety, Presented at 2011 MENAPS Middle East and North Africa Perforating Symposium, Nov. 28-30, 2011, 6 pages.
Norwegan Industrial Property Office, Search Report for NO U.S. Appl. No. 20/160,017, which is in the same family as PCT App No. PCT/CA2014/050673, dated Jun. 15, 2017, 2 pgs.
Fiip, Search Report dated Feb. 1, 2018, in English See Search Report for RU App. No. 2016104882/03, which is in the same family as PCT App. No. PCT/CA2014/050673, 4 pages.
Horizontal Wireline Services, LLC and Allied Wireline Services, LLC; Exhibit A20 U.S. Patent Application No. 2012/0199352 to Lanclos vs. Asserted Claims of U.S. Pat. No. 10,844,697; dated Aug. 30, 2021; 24 pages.
Horizontal Wireline Services, LLC and Allied Wireline Services, LLC; Exhibit A21 "3.12-in Frac Gun" Publication and 3.12-in Frac Gun System, both by Schlumberger vs. Asserted Claims of U.S. Pat. No. 10,844,697; dated Aug. 30, 2021; 26 pages.
Horizontal Wireline Services, LLC and Allied Wireline Services, LLC; Exhibit A22 "New Select-Fire System" Publication and Select-Fire System, both by BakerHughes vs. Asserted Claims of U.S. Pat. No. 10,844,697; dated Aug. 30, 2021; 14 pages.
Horizontal Wireline Services, LLC and Allied Wireline Services, LLC; Exhibit A23 Amit Govil, "Selective Perforation: A Game Changer in Perforating Technology—Case Study," 2012 European and West African Perforating Symposium vs. Asserted Claims of U.S. Pat. No. 10,844,697; dated Aug. 30, 2021; 17 pages.
Horizontal Wireline Services, LLC and Allied Wireline Services, LLC; Exhibit A24 Schlumberger SafeJet System vs. Asserted Claims of U.S. Pat. No. 10,844,697; dated Aug. 30, 2021; 26 pages.
Horizontal Wireline Services, LLC and Allied Wireline Services, LLC; Exhibit A3 U.S. Pat. No. 7,901,247 to Ring vs. Asserted Claims of U.S. Pat. No. 10,844,697; dated Aug. 30, 2021; 19 pages.
Horizontal Wireline Services, LLC and Allied Wireline Services, LLC; Exhibit A4 U.S. Pat. No. 9,145,764 to Burton, et al. vs. Asserted Claims of U.S. Pat. No. 10,844,697; dated Aug. 30, 2021; 18 pages.
Horizontal Wireline Services, LLC and Allied Wireline Services, LLC; Exhibit A5 U.S. Pat. No. 9,175,553 to Mcann, et al. vs. Asserted Claims of U.S. Pat. No. 10,844,697; dated Aug. 30, 2021; 26 pages.
Horizontal Wireline Services, LLC and Allied Wireline Services, LLC; Exhibit A6 U.S. Pat. No. 9,689,223 to Schacherer vs. Asserted Claims of U.S. Pat. No. 10,844,697; dated Aug. 30, 2021; 8 pages.
Horizontal Wireline Services, LLC and Allied Wireline Services, LLC; Exhibit A7 International (PCT) Publication No. WO2014/089194 to Rogman, et al. vs. Asserted Claims of U.S. Pat. No. 10,844,697; dated Aug. 30, 2021; 16 pages.
Horizontal Wireline Services, LLC and Allied Wireline Services, LLC; Exhibit A8 U.S. Patent Application Pub. No. 2008/0073081 to Frazier, et al. vs. Asserted Claims of U.S. Pat. No. 10,844,697; dated Aug. 30, 2021; 33 pages.
Horizontal Wireline Services, LLC and Allied Wireline Services, LLC; Exhibit A9 U.S. Pat. No. 9,065,201 to Borgfeld, et al. vs. Asserted Claims of U.S. Pat. No. 10,844,697; dated Aug. 30, 2021; 14 pages.
Hunting Titan, Inc.; Defendant's Answer, Affirmative Defenses, and Counterclaims to Plaintiffs' Second Amended Complaint for Civil Action No. 4:20-cv-02123; dated Sep. 10, 2021; 77 pages.
Hunting Titan, Inc.; Defendant's Responsive Claim Construction Brief for Civil Action No. 4:20-cv-02123; dated Oct. 1, 2021; 31 pages.
Hunting Titan, Inc; Petitioner's Sur-Reply on Patent Owner's Motion to Amend for IPR No. 2018-00600; dated Apr. 11, 2019; 17 pages.
Logan, et al.; International Patent Application No. PCT/CA2013/050986; dated Dec. 18, 2013; 54 pages.
Nextier Completion Solutions Inc.; Defendant Nextier Completion Solutions Inc.'s First Amended Answer and Counterclaims to Plaintiffs' First Amended Complaint for Civil Action No. 6:20-CV-01201; dated Jun. 28, 2021; 17 pages.
Nextier Completion Solutions Inc.; Defendant's Preliminary Invalidity Contentions for Civil Action No. 6:20-cv-01201-ADA; dated Aug. 30, 2021; 21 pages.
Nextier Completion Solutions Inc.; Exhibit A-1 BakerHughes Select-Fire; dated Aug. 30, 2021; 33 pages.
Nextier Completion Solutions Inc.; Exhibit A-10 U.S. Pat. No. 7,762,331 to Goodman; dated Aug. 30, 2021; 4 pages.
Nextier Completion Solutions Inc.; Exhibit A-11 U.S. Patent Publication No. 2016/0084048 A1 to Harrigan et al.; dated Aug. 30, 2021; 4 pages.
Nextier Completion Solutions Inc.; Exhibit A-12 Provisional U.S. Appl. No. 61/819,196 to Harrigan et al.; dated Aug. 30, 2021; 26 pages.
Nextier Completion Solutions Inc.; Exhibit A-13 U.S. Pat. No. 9,874,083 to Logan; dated Aug. 30, 2021; 18 pages.
Nextier Completion Solutions Inc.; Exhibit A-14 New Select-Fire System; dated Aug. 30, 2021; 33 pages.
Nextier Completion Solutions Inc.; Exhibit A-15 U.S. Pat. No. 10,077,641 to Rogman; dated Aug. 30, 2021; 36 pages.
Nextier Completion Solutions Inc.; Exhibit A-16 Provisional U.S. Appl. No. 61/733,129 to Rogman; dated Aug. 30, 2021; 55 pages.
Nextier Completion Solutions Inc.; Exhibit A-17 U.S. Pat. No. 8,387,533 to Runkel; dated Aug. 30, 2021; 5 pages.
Nextier Completion Solutions Inc.; Exhibit A-18 Schlumberger SafeJet; dated Aug. 30, 2021; 13 pages.
Nextier Completion Solutions Inc.; Exhibit A-19 U.S. Pat. No. 7,226,303 to Shaikh; dated Aug. 30, 2021; 4 pages.
Nextier Completion Solutions Inc.; Exhibit A-2 U.S. Pat. No. 6,506,083 to Bickford et al.; dated Aug. 30, 2021; 3 pages.
Nextier Completion Solutions Inc.; Exhibit A-20 U.S. Pat. No. 8,943,943 to Carlos Jose Tassaroli; dated Aug. 30, 2021; 7 pages.
Nextier Completion Solutions Inc.; Exhibit A-3 U.S. Patent Pub. No. US 2012/0247771 A1 to Black et al.; dated Aug. 30, 2021; 30 pages.
Nextier Completion Solutions Inc.; Exhibit A-4 U.S. Pat. No. 4,457,383 to Gene T. Boop; dated Aug. 30, 2021; 22 pages.
Nextier Completion Solutions Inc.; Exhibit A-5 U.S. Pat. No. 3,173,229 to Gene T. Boop; dated Aug. 30, 2021; 12 pages.
Nextier Completion Solutions Inc.; Exhibit A-6 U.S. Pat. No. 9,065,201 to Borgfeld et al.; dated Aug. 30, 2021; 3 pages.
Nextier Completion Solutions Inc.; Exhibit A-7 U.S. Pat. No. 6,582,251 to Burke et al.; dated Aug. 30, 2021; 3 pages.
Nextier Completion Solutions Inc.; Exhibit A-8 U.S. Patent Publication No. 2013/0126237 A1 to Burton; dated Aug. 30, 2021; 3 pages.
Nextier Completion Solutions Inc.; Exhibit A-9 Selective perforation: A Game Changer in Peforating Technology- Case Study; dated Aug. 30, 2021; 13 pages.
Nexus Perforating LLC; Nexus Preliminary Claim Construction and Extrinsic Evidence for Civil Action No. 4:21-cv-00280; dated Aug. 4, 2021; 6 pages.
Perfx's Wireline Services, LLC; Exhibit A-1: Invalidity Chart for U.S. Pat. No. 10,844,697 in view of the Dynawell Gun System; dated Aug. 30, 2021; 30 pages.

(56) References Cited

OTHER PUBLICATIONS

Perfx's Wireline Services, LLC; Exhibit A-2: Invalidity Chart for U.S. Pat. No. 10,844,697 in view of the LRI Gun System; dated Aug. 30, 2021; 29 pages.
Perfx's Wireline Services, LLC; Exhibit A-3: Invalidity Chart for U.S. Pat. No. 10,844,697 in view of the Owen Dil Tools System; dated Aug. 30, 2021; 42 pages.
Perfx's Wireline Services, LLC; Exhibit A-4: Invalidity Chart for U.S. Pat. No. 10,844,697 in view of the Select Fire System; dated Aug. 30, 2021; 32 pages.
Perfx's Wireline Services, LLC; Exhibit A-5: Invalidity Chart for U.S. Pat. No. 10,844,697 in view of U.S. Pat. No. 5,042,594; dated Aug. 30, 2021; 27 pages.
Perfx's Wireline Services, LLC; Exhibit A-6: Invalidity Chart for U.S. Pat. No. 10,844,697 in view of U.S. Pat. No. 4,007,796; dated Aug. 30, 2021; 23 pages.
Perfx's Wireline Services, LLC; Exhibit A-7: Invalidity Chart for U.S. Pat. No. 10,844,697 in view of U.S. Pat. No. 9,145,764; dated Aug. 30, 2021; 36 pages.
Perfx's Wireline Services, LLC; Exhibit A-8: Invalidity Chart for U.S. Pat. No. 10,844,697 in view of U.S. Pat. No. 10,077,6414; dated Aug. 30, 2021; 29 pages.
Perfx's Wireline Services, LLC; Exhibit A-9: Invalidity Chart for U.S. Pat. No. 10,844,697 in view of the SafeJet System; dated Aug. 30, 2021; 18 pages.
Perfx's Wireline Services, LLC; Exhibit B-1: Invalidity Chart for U.S. Pat. No. D. 904,475 in view of the Dynawell Tandem Sub; dated Aug. 30, 2021; 10 pages.
Perfx's Wireline Services, LLC; Exhibit B-2: Invalidity Chart for U.S. Pat. No. D. 904,475 in view of the LRI Tandem Subassembly; dated Aug. 30, 2021; 12 pages.
United States District Court for the Southern District of Texas; Memorandum Opinion and Order for Civil Action No. H-20-2123; dated Sep. 19, 2022; 115 pages.
United States Patent and Trial Appeal Board; Final Written Decision on PGR2021-00078; issued Oct. 28, 2022; 139 pages.
IPR2018-00600, Exhibit 3001, Patent Owner's Precedential Opinion Panel Request Letter in regard to Case IPR2018-00600 for U.S. Pat. No. 9,581,422 B2, dated Sep. 18, 2019, 2 pg.
United States Patent and Trademark Office, Case IPR2018-00600 for U.S. Pat. No. 9,581,422 B2, Patent Owner's Motion to Amend, dated Dec. 6, 2018, 53 pgs.
Buche & Associates, P.C.; Rule 501 Citation of Prior Art and Written "Claim Scope Statements" in U.S. Pat. No. 10,844,697; dated Mar. 3, 2021; 24 pages.
Canadian Intellectual Property Office; Office Action for CA Application No. 2,941,648; dated Mar. 15, 2021; 3 pages.
Canadian Intellectual Property Office; Office Action for CA Application No. 3,070,118; dated Mar. 16, 2021; 3 pages.
Corelab Owen Oil Tools; Expendable Perforating Guns Description; https://www.corelab.com/owen/cms/docs/Canada/10A_erhsc-01.0-c.pdf; 2008; 7 pages.
Dynaenergetics Europe GMBH; Complaint and Demand for Jury Trial for Civil Action No. 4:21-cv-00280; dated Jan. 28, 2021; 55 pages.
Halliburton; Wireline and Perforating Advances in Perforating; dated Nov. 2012; 12 pages.
Hunting Titan; Electrical Cable Heads Brochure; http://www.hunting-intl.com/media/1967991/ElectricalCableHeads.pdf; 2014; 3 pages.
United States Patent and Trademark Office; Final Office Action for U.S. Appl. No. 16/540,484; dated Feb. 19, 2021; 12 pages.
United States Patent Trial and Appeal Board; Institution Decision for PGR 2020-00080; dated Feb. 12, 2021; 15 pages.
Vigor Petroleum; Perforating Gun Accessories Product Description; https://www.vigordrilling.com/completion-tools/perforating-gun-accessories.html; 2021; 1 page.
Dynaenergetics, Selective Perforating Switch, information downloaded from website, Jul. 3, 2013, http://www.dynaenergetics.com/.
Dynaenergetics, Electronic Top Fire Detonator, Product Information Sheet, Jul. 30, 2013.
PCT Search Report and Written Opinion, mailed May 4, 2015: See Search Report and Written opinion for PCT Application No. PCT/EP2014/065752.
Jim Gilliat/Khaled Gasmi, New Select-Fire System, Baker Hughes, Presentation—2013 Asia-Pacific Perforating Symposium, Apr. 29, 2013.

* cited by examiner

PERFORATING GUN AND DETONATOR ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a Continuation Application of U.S. application Ser. No. 14/767,058 filed Aug. 11, 2015, and claims priority to PCT Application No. PCT/EP2014/065752 filed Jul. 22, 2014, which claims priority to German Patent Application No. 102013109227.6 filed Aug. 26, 2013, each of which is incorporated herein by reference in its entirety.

FIELD

Devices and methods for selective actuation of wellbore tools are generally described. In particular, devices and methods for selective arming of a detonator assembly of a perforating gun assembly are generally described.

BACKGROUND

Hydrocarbons, such as fossil fuels (e.g. oil) and natural gas, are extracted from underground wellbores extending deeply below the surface using complex machinery and explosive devices. Once the wellbore is established by placement of cases after drilling, a perforating gun assembly, or train or string of multiple perforating gun assemblies, are lowered into the wellbore, and positioned adjacent one or more hydrocarbon reservoirs in underground formations. The perforating gun has explosive charges, typically shaped, hollow or projectile charges, which are ignited to create holes in the casing and to blast through the formation so that the hydrocarbons can flow through the casing. Once the perforating gun(s) is properly positioned, a surface signal actuates an ignition of a fuse, which in turn initiates a detonating cord, which detonates the shaped charges to penetrate/perforate the casing and thereby allow formation fluids to flow through the perforations thus formed and into a production string. The surface signal typically travels from the surface along electrical wires that run from the surface to one or more detonators positioned within the perforating gun assembly.

Assembly of a perforating gun requires assembly of multiple parts, which typically include at least the following components: a housing or outer gun barrel within which is positioned an electrical wire for communicating from the surface to initiate ignition, a percussion initiator and/or a detonator, a detonating cord, one or more charges which are held in an inner tube, strip or carrying device and, where necessary, one or more boosters. Assembly typically includes threaded insertion of one component into another by screwing or twisting the components into place, optionally by use of a tandem adapter. Since the electrical wire must extend through much of the perforating gun assembly, it is easily twisted and crimped during assembly. In addition, when a wired detonator is used it must be manually connected to the electrical wire, which has lead to multiple problems. Due to the rotating assembly of parts, the wires can become torn, twisted and/or crimped/nicked, the wires may be inadvertently disconnected, or even mis-connected in error during assembly, not to mention the safety issues associated with physically and manually wiring live explosives.

According to the prior art and as shown in FIG. 1, the wired detonator 60 has typically been configured such that wires must be physically, manually connected upon configuration of the perforating gun assembly. As shown herein, the wired detonator 60 typically has three (or more) wires, (although it is possible to have one or more wires whereby one wire could also be a contact (as described in greater detail below and as found, for instance, in a spring-contact detonator, commercially available from DynaEnergetics GmbH & Co. KG without the benefit of selectivity) and whereby a second connection would be through a shell or head of the detonator), which require manual, physical connection once the wired detonator is placed into the perforating gun assembly. For detonators with a wired integrated switch for selective perforating, the wires typically include at least a signal-in wire 61, a signal-out wire 62 and a ground wire 63, while it is possible that only two wires are provided and the third or ground connection is made by connecting the third wire to the shell or head of the. In a typical manual, physical connection, the wires extending along the perforating gun are matched to the wires of the detonator, and an inner metallic portion of one wire is twisted together with an inner metallic portion of the matched wire using an electrical connector cap or wire nut or a scotch-lock type connector.

The detonator assembly described herein does away with the wired connection by providing a wirelessly-connectable, selective detonator, more specifically, a detonator configured to be received within a detonator positioning assembly through a wireless connection—that is, without the need to attach wires to the detonator. For the sake of clarity, the term "wireless" does not refer to a WiFi connection. The detonator assembly described herein solves the problems associated with the wired detonator of the prior art in that it is simple to assemble and is almost impossible to falsely connect.

BRIEF DESCRIPTION

An embodiment provides a wirelessly-connectable selective detonator assembly configured for being electrically contactably received within a perforating gun assembly without using a wired electrical connection according to claim 1.

Another embodiment provides a perforating gun assembly including the wirelessly-connectable selective detonator assembly and a detonator positioning assembly according to the independent assembly claim.

Another embodiment provides a method of assembling the perforating gun assembly according to the independent method claim.

BRIEF DESCRIPTION OF THE FIGURES

A more particular description briefly described above will be rendered by reference to specific embodiments thereof that are illustrated in the appended drawings. Understanding that these drawings depict only typical embodiments and are not therefore to be considered to be limiting of its scope, exemplary embodiments will be described and explained with additional specificity and detail through the use of the accompanying drawings in which.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to embodiments.

DETAILED DESCRIPTION

Reference will now be made in detail to embodiments. Each example is provided by way of explanation, and is not meant as a limitation and does not constitute a definition of all possible embodiments.

In an embodiment, a detonator assembly is provided that is capable of being positioned or placed into a perforating gun assembly with minimal effort, by means of placement/positioning within a detonator positioning assembly. In an embodiment, the detonator positioning assembly includes the detonator assembly positioned within the detonator positioning assembly, which is positioned within the perforating gun assembly. The detonator assembly electrically contactably forms an electrical connection without the need of manually and physically connecting, cutting or crimping wires as required in a wired electrical connection. Rather, the detonator assembly described herein is a wirelessly-connectable selective detonator assembly.

In an embodiment, the detonator assembly is particularly suited for use with a modular perforating gun assembly as described in a Canadian Patent Application No. 2,824,838 filed Aug. 26, 2013, entitled PERFORATION GUN COMPONENTS AND SYSTEM, (hereinafter "the Canadian Application"), which is incorporated herein by reference in its entirety. The Canadian Application describes a modular-type perforating gun which means that at least some of the components are typically snapped, clicked, or plugged together, rather than screwed, twisted or rotated together as discussed above. That is, the modular perforating gun includes components that are fit together using studs or pins protruding from one component, that are frictionally fit into recessed areas or sockets in an adjoining component.

As used herein, the term "wireless" means that the detonator assembly itself is not manually, physically connected within the perforating gun assembly as has been traditionally done with wired connections, but rather merely makes electrical contact through various components as described herein to form the electrical connections. Thus, the signal is not being wirelessly transmitted, but is rather being relayed through electrical cables/wiring within the perforating gun assembly through the electrical contacts.

Figure 1:
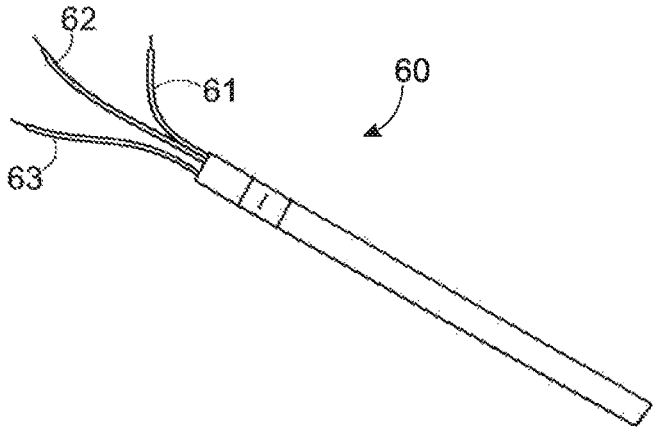
Prior Art FIG. 1
FIG. 1 is a perspective view of a wired detonator according to the prior art.
Figure 2:
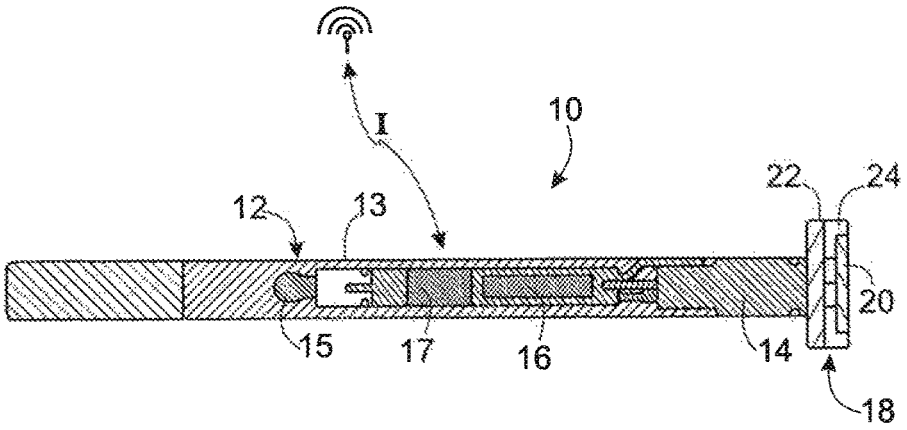
FIG. 2 is a cross-sectional side view of a wirelessly-connectable selective detonator assembly according to an aspect.
Figure 3:
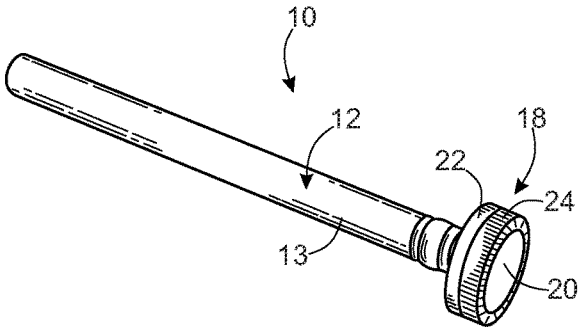
FIG. 3 is a perspective view of the detonator assembly according to FIG. 1.

Now referring to FIGS. 2 and 3, according to an embodiment, a wirelessly-connectable selective detonator assembly 10 is provided for use in a perforating gun assembly 40. The detonator assembly 10 includes a detonator shell 12 and a detonator head 18 and is configured for being electrically contactably received within a perforating gun assembly 40 without using a wired electrical connection, that is without connecting one or more wires directly to the detonator assembly 10.

In an embodiment, the detonator shell 12 is configured as a housing or casing, typically a metallic, which houses at least a detonator head plug 14, a fuse head 15, an electronic circuit board 16 and explosive components. According to one aspect, the fuse head 15 could be any device capable of converting an electric signal into an explosion. In an embodiment shown in FIG. 2, the detonator shell 12 is shaped as a hollow cylinder. The electronic circuit board 16 is connected to the fuse head 14 and is configured to allow for selective detonation of the detonator assembly 10. In an embodiment, the electronic circuit board 16 is configured to wirelessly and selectively receive an ignition signal I, (typically a digital code uniquely configured for a specific detonator), to fire the perforating gun assembly 40. By "selective" what is meant is that the detonator assembly is configured to receive one or more specific digital sequence (s), which differs from a digital sequence that might be used to arm and/or detonate another detonator assembly in a different, adjacent perforating gun assembly, for instance, a train of perforating gun assemblies. So, detonation of the various assemblies does not necessarily have to occur in a specified sequence. Any specific assembly can be selectively detonated. In an embodiment, the detonation occurs in a down-up or bottom-up sequence.

The detonator head 18 extends from one end of the detonator shell 12, and includes more than one electrical contacting component including an electrically contactable line-in portion 20 and an electrically contactable line-out portion 22, according to an aspect. According to one aspect, the detonator assembly 10 may also include an electrically contactable ground portion 13. In an embodiment, the detonator head 18 may be disk-shaped. In another embodiment, at least a portion of the detonator shell 12 is configured as the ground portion 13. The line-in portion 20, the line-out portion 22 and the ground portion 13 are configured to replace the wired connection of the prior art wired detonator 60 and to complete the electrical connection merely by contact with other electrical contacting components. In this way, the line-in portion 20 of the detonator assembly 10 replaces the signal-in wire 61 of the wired detonator 60, the line-out portion 22 replaces the signal-out wire 62 and the ground portion 13 replaces the ground wire 63. Thus, when placed into a detonator positioning assembly 30 (see FIG. 4) as discussed in greater detail below, the line-in portion 20, the line-out portion 22 and the ground portion 13 of the detonator assembly 10 make an electrical connection by merely making contact with corresponding electrical contacting components (also as discussed in greater detail below). That is, the detonator assembly 10 is wirelessly connectable only by making and maintaining electrical contact of the electrical contacting components to replace the wired electrical connection and without using a wired electrical connection.

The detonator head 18 also includes an insulator 24, which is positioned between the line-in portion 20 and the line-out portion 22. The insulator 24 functions to electrically isolate the line-in portion 20 from the line-out portion 22. Insulation may also be positioned between other lines of the detonator head. As discussed above and in an embodiment, it is possible for all of the contacts to be configured as part of the detonator head 18 (not shown), as found, for instance, in a banana connector used in a headphone wire assembly in which the contacts are stacked longitudinally along a central axis of the connector, with the insulating portion situated between them.

In an embodiment, a capacitor 17 is positioned or otherwise assembled as part of the electronic circuit board 16. The capacitor 17 is configured to be discharged to initiate the detonator assembly 10 upon receipt of a digital firing sequence via the ignition signal I, the ignition signal being electrically relayed directly through the line-in portion 20 and the line-out portion 22 of the detonator head 18. In a typical arrangement, a first digital code is transmitted downhole to and received by the electronic circuit board. Once it is confirmed that the first digital code is the correct code for that specific detonator assembly, an electronic gate is closed and the capacitor is charged. Then, as a safety feature, a second digital code is transmitted to and received by the electronic circuit board. The second digital code, which is also confirmed as the proper code for the particular detonator, closes a second gate, which in turn discharges the capacitor via the fuse head to initiate the detonation.

In an embodiment, the detonator assembly 10 may be fluid disabled. "Fluid disabled" means that if the perforating gun has a leak and fluid enters the gun system then the detonator is disabled by the presence of the fluid and hence the explosive train is broken. This prevents a perforating gun from splitting open inside a well if it has a leak and plugging the wellbore, as the hardware would burst open. In an embodiment, the detonator assembly 10 is a selective fluid disabled electronic (SFDE) detonator assembly.

The detonator assembly 10 according to an aspect can be either an electric or an electronic detonator. In an electric detonator, a direct wire from the surface is electrically contactingly connected to the detonator assembly and power is increased to directly initiate the fuse head. In an electronic detonator assembly, circuitry of the electronic circuit board within the detonator assembly is used to initiate the fuse head.

In an embodiment, the detonator assembly 10 may be immune, that is, will not unintentionally fire or be armed by stray current or voltage and/or radiofrequency (RF) signals to avoid inadvertent firing of the perforating gun. Thus, in this embodiment, the assembly is provided with means for ensuring immunity to high stray current or voltage and/or RF signals, such that the detonator assembly 10 is not initiated through random radio frequency signals, stray voltage or stray current. In other words, the detonator assembly 10 is configured to avoid unintended initiation and would fail safe.

Figure 4:
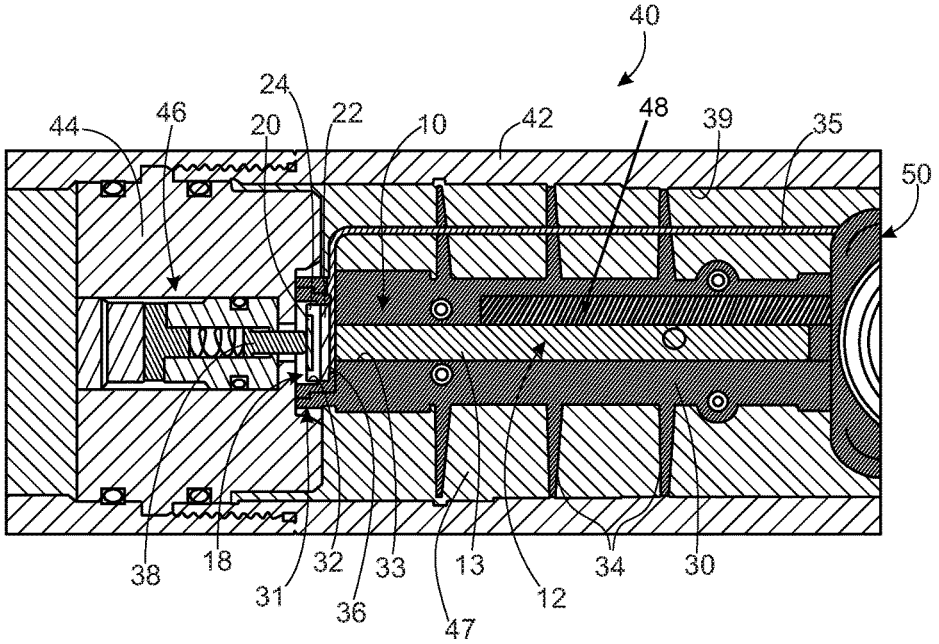
FIG. 4 is a partial cross-sectional side view a perforating gun assembly including the detonator assembly seated within a detonator positioning assembly according to an aspect.
Figure 5:
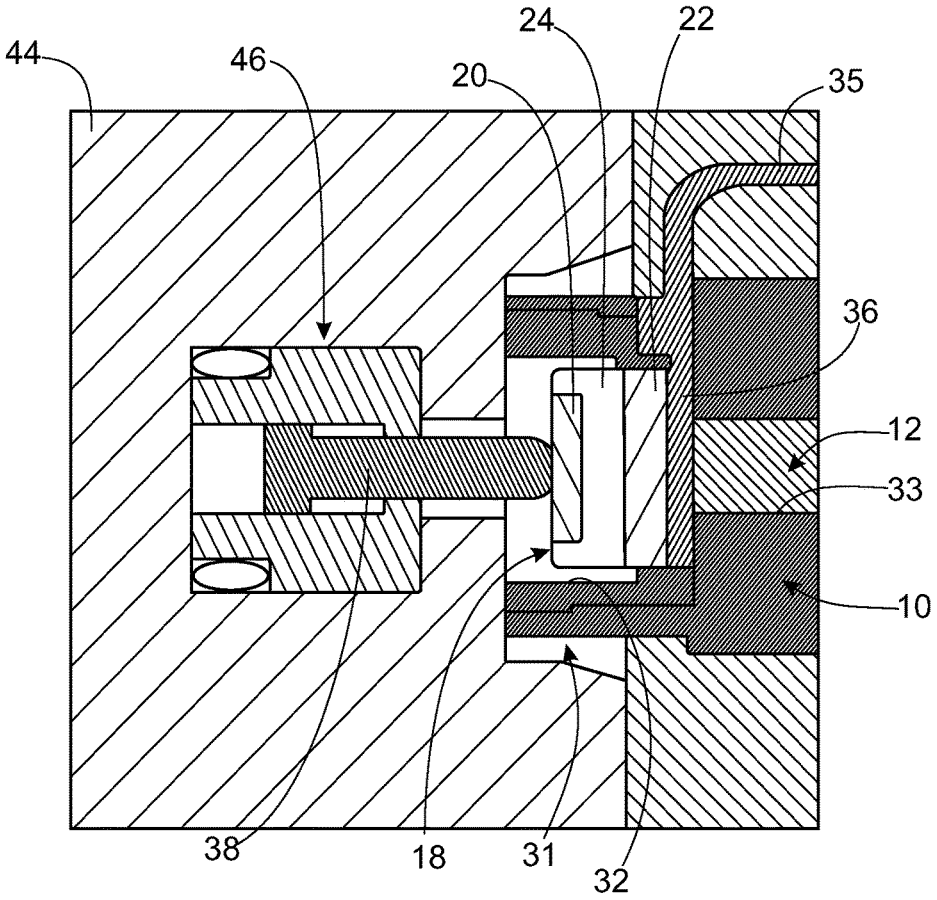
FIG. 5 is an exploded cross-sectional side view of FIG. 4 showing an electrically contactingly electrical connection without using a wired electrical connection according to an aspect.
Figure 6:
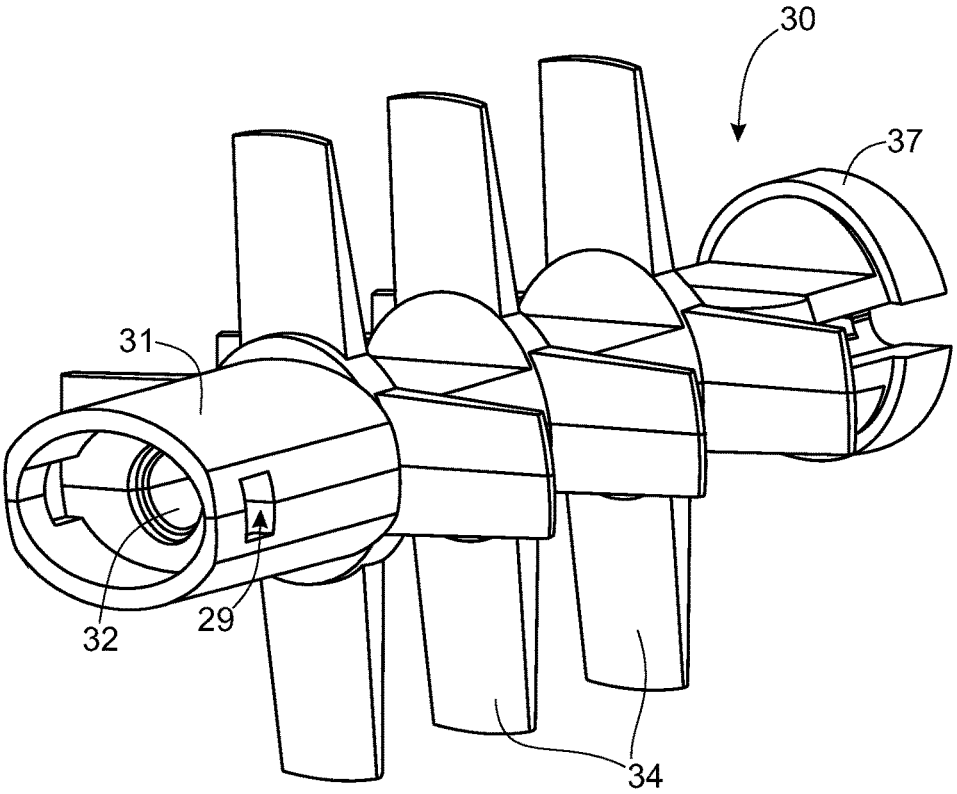
FIG. 6 is a perspective view of the detonator positioning assembly according to an aspect, showing an assembly as if a wired detonator were used.

The detonator assembly 10 is configured to be electrically contactingly received within the detonator positioning assembly 30, in which an embodiment is depicted in FIGS. 4-6, which is seated or positioned within the perforating gun assembly 40, without using the wired electrical connection. In an embodiment, the perforating gun assembly 40 is a modular assembly as discussed above. The detonator positioning assembly 30 is also configured for electrically contactingly receiving the detonator assembly 10 without using the wired electrical connection.

In an embodiment and as shown in FIG. 6, a sleeve 31 extends from one end of the detonator positioning assembly 30. As shown herein, the detonator positioning assembly 30 includes a connecting portion 37 extending from the end opposite the sleeve 31, which is useful in a modular assembly and that would have studs or recesses extending from or recessed into the connecting portion (not shown). The sleeve 31 is configured to receive and hold in place, in at least a semi-fixed position, the detonator head 18 of the detonator assembly 10. As used herein, "hold" means to enclose within bounds, to limit or hold back from movement or to keep in a certain position. As shown herein, the detonator positioning assembly 30 includes a portion that extends from the sleeve 31 in which a wire-receiving hole 29 is provided for insertion of electrical wires extending along the length of the perforating gun assembly. With reference again to FIG. 6, also shown are directional locking fins 34 engageable with corresponding complementarily-shaped structures 47 housed within the perforating gun housing 42, upon a rotation of a top connector (not shown), to lock a position of the top connector along the length of the carrier 42, as more fully described in the Canadian Application.

With particular reference to FIG. 4, the detonator positioning assembly 30 is positioned within the perforating gun assembly 40 and functions to receive and hold in place the detonator assembly 10 according to an aspect. In addition, the detonator positioning assembly 30 also functions to provide electrical contacting components for wirelessly-connectably electrically receiving the detonator assembly 10 as will be discussed in greater detail below.

The detonator positioning assembly 30 abuts and connects or snap-fits to grounding means, depicted herein as the gun body or barrel or carrier or housing 42, for grounding the detonator assembly 10. A tandem seal adapter 44 is configured to seal inner components within the perforating gun housing 42 from the outside environment using sealing means. The tandem seal adapter 44 seals adjacent perforating gun assemblies (not shown) from each other, along with a bulkhead assembly 46.

The bulkhead assembly 46 functions to relay a line-in contact-initiating pin 38 for wirelessly electrically contacting the line-in portion 20 of the detonator head 18.

Turning again to the detonator positioning assembly 30, in a preferred embodiment, the sleeve 31 includes a recessed portion 32 that includes an opening on one end and a base on the opposite end of the recessed portion. Preferably, the sleeve 31 also includes a bore 33 positioned at the base, more preferably in the center of the base of the recessed portion 32. The bore 33 extends within and along at least a portion of a length of the detonator positioning assembly 30 such that when the detonator assembly 10 is positioned within the sleeve 31, the detonator shell 12 is positioned in the bore 33.

In an embodiment, the recessed portion 32 and the detonator head 18 are complementarily sized and shaped to receive and seat/be received and seated, respectively, in at least a semi-fixed position within the detonator positioning assembly 30.

In yet another embodiment, the sleeve 31 includes a line-out contact-receiving portion 36 configured for electrically contactingly engaging the line-out portion 22 of the detonator head 18 to form a first electrical connection. In other words, the electrical connection is made only by contact with the line-out portion of the detonator head 18 . . . that is by merely physically touching.

Preferably, a line-in contact-initiating pin 38 is provided and configured for electrically contactingly engaging the line-in portion 20 of the detonator head 18 to form a second electrical connection, and the ground portion 13 is configured for electrically contactingly engaging an inner wall or surface of the gun carrier 42, otherwise referred to as a ground contact-receiving portion 39, to form a third electrical connection. The connection is made, in this embodiment, via an integral ground connection in the detonator positioning assembly 30 and the locking fins 34. In an embodiment, the detonator positioning assembly 30 and the locking fins 34 may be made from conductive material. Thus, when the detonator assembly 10 is positioned within the detonator positioning assembly 30, the first, second and third electrical connections are completed without using a wired electrical connection. In an embodiment, the line-out contact-receiving portion 36 is positioned at the base of the recessed portion 32 of the sleeve 31.

In an embodiment, the line-in contact-initiating pin 38, the line-out contact-receiving portion 36 and the ground contact-receiving portion 39, as well as the line-in portion 20, the line-out portion 22 and the ground portion 13 are physically isolated from each other.

In an embodiment, a through wire 35 extends between the line-out contact-receiving portion 36 of the perforating gun assembly 40 to an adjacent perforating gun assembly in a multiple gun arrangement or train.

In an embodiment, a detonating cord 48 is positioned within the detonator positioning assembly 30, adjacent to the bore 33, such that at least a portion of the detonating cord 48 is in side-by-side contact with at least a portion of the detonator shell 12 at the end opposite the detonator head 18.

In operation and in an embodiment, the ignition signal I is received by the detonator assembly 10, which ignites the detonating cord 48, which in turn ignites each of the charge(s) 50 attached to the detonating cord. Transmission of the signal I is conducted along the through wire 35, without the need to manually connect the through wire 35 to the detonator assembly 10, that is, without using a wired electrical connection, while the electrical contacts are completed upon placement of the detonator assembly 10 into the detonator positioning assembly 30.

According to an aspect, a method of assembling the perforating gun assembly 40 without using a wired electrical connection is also provided. The method includes the steps of positioning the detonator positioning assembly 30 within the perforating gun assembly 40 and positioning a wirelessly-connectable selective electronic detonator assembly 10 within the detonator positioning assembly 30. In yet another embodiment, the method includes assembling a modular perforating gun assembly and the method includes frictionally fitting or snap-fitting components together.

The components and methods illustrated are not limited to the specific embodiments described herein, but rather, features illustrated or described as part of one embodiment can be used on or in conjunction with other embodiments to yield yet a further embodiment. It is intended that all such modifications and variations are included. Further, steps described in the method may be utilized independently and separately from other steps described herein.

While the device and method have been described with reference to a preferred embodiment, it will be understood by those skilled in the art that various changes may be made and equivalents may be substituted for elements thereof without departing from the intended scope. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment," "an embodiment," and the like are not intended to be interpreted as excluding the existence of additional embodiments that also incorporate the recited features. Terms such as "first," "second," etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of."

Advances in science and technology may make equivalents and substitutions possible that are not now contemplated by reason of the imprecision of language; these variations should be covered by the appended claims. This written description uses examples to disclose the device and method, including the best mode, and also to enable any person of ordinary skill in the art to practice the device and method, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

[1. A wireless detonator assembly configured for being electrically contactably received within a perforating gun assembly without using a wired electrical connection, comprising:

a shell configured for housing components of the detonator assembly;

more than one electrical contact component, wherein at least one of the electrical contact components extends from the shell and further wherein the electrical contact component comprises an electrically contactable line-in portion, an electrically contactable line-out portion and an electrically contactable ground portion, the ground portion in combination with the line-in portion and the line-out portion being configured to replace the wired electrical connection to complete an electrical connection merely by contact;

an insulator positioned between the line-in portion and the line-out portion, wherein the insulator electrically isolates the line-in portion from the line-out portion; and means for selective detonation housed within the shell, wherein the detonator assembly is configured for electrically contactably forming the electrical connection merely by the contact.]

[2. The wireless detonator assembly of claim 1, wherein the means for selective detonation further comprise an electronic circuit board and means for receiving an ignition signal.]

[3. The wireless detonator assembly of claim 2, further comprising a capacitor positioned on the electronic circuit board, the capacitor configured to be discharged to initiate the detonator assembly upon receipt of a digital firing sequence via an ignition signal, the ignition signal being electrically relayed directly through the line-in portion and the line-out portion.]

[4. The wireless detonator assembly of claim 2, further comprising means for ensuring immunity to stray current or voltage or radio frequency signals, such that the detonator assembly is not unintentionally armed or initiated.]

[5. A perforating gun assembly, comprising:

a wirelessly-connectable selective detonator assembly configured for being electrically contactably received within the perforating gun assembly without using a wired electrical connection, the detonator assembly comprising:

a shell configured for housing components of the detonator assembly;

more than one electrically contactable component, wherein at least one of the electrical contact components extends from the shell and further wherein the electrical contact component comprises an electrically contactable line-in portion, an electrically contactable line-out portion, and an electrically contactable ground portion, the ground portion in combination with the line-in portion and the line-out portion being configured to replace the wired electrical connection to complete an electrical connection merely by contact;

an insulator positioned between the line-in portion and the line-out portion, wherein the insulator electrically isolates the line-in portion from the line-out portion; and means for selective detonation of the detonator assembly, wherein the means for selective detonation is housed within the shell, and the detonator assembly configured for electrically contactably forming the electrical connection merely by the contact and without the need of manually and physically connecting wires.]

[6. The perforating gun assembly of claim 5, wherein the means for selective detonation further comprise an electronic circuit board and means for receiving an ignition signal.]

[7. The perforating gun assembly of claim 6, further comprising a capacitor positioned on the electronic circuit board, the capacitor being configured to be discharged to initiate the detonator assembly upon receipt of a digital firing sequence via an ignition signal, and the ignition signal being electrically relayed directly through the line-in portion and the line-out portion.]

[8. The perforating gun assembly of claim 5, further comprising a detonating cord positioned within the perforating gun assembly such that at least a portion of the detonating cord is in contact with the detonator assembly.]

[9. The perforating gun assembly of claim 8, wherein the detonator assembly is configured for initiating the detonating cord without the detonating cord having to be attached to the detonator assembly.]

[10. The perforating gun assembly of claim 8, wherein the detonating cord is positioned in side-by-side contact with at least a portion of the shell.]

[11. The perforating gun assembly of claim 5, further comprising means for ensuring immunity to stray current or voltage or radio frequency signals, such that the detonator assembly is not unintentionally armed or initiated.]

[12. A method of assembling a perforating gun assembly without using a wired electrical connection, comprising:

positioning a wirelessly-connectable selective detonator assembly within the perforating gun assembly, wherein the detonator assembly comprises:

a shell configured for housing components of the detonator assembly;

more than one electrically contactable component, wherein at least one of the electrical contact components extends from the shell and further wherein the electrical contact component comprises an electrically contactable line-in portion, an electrically contactable line-out portion, and an electrically contactable ground portion, the ground portion in combination with the line-in portion and the line-out portion being configured to replace the wired electrical connection to complete a wireless electrical connection merely by contact;

an insulator positioned between the line-in portion and the line-out portion, wherein the insulator electrically isolates the line-in portion from the line-out portion; and means for selective detonation of the detonator assembly, electrically contactingly connecting the detonator assembly such that the detonator assembly electrically contactably forms the wireless electrical connection merely by the contact and without the need of manually and physically connecting wires.]

[13. The method of assembling the perforating gun assembly of claim 12, further comprising:

positioning a detonator positioning assembly within the perforating gun assembly; and positioning the wirelessly-connectable selective detonator assembly within the detonator positioning assembly.]

[14. The method of assembling the perforating gun assembly of claim 12, further comprising:

positioning a detonating cord within the perforating gun assembly such that at least a portion of the detonating cord is in contact with the detonator assembly.]

[15. The method of assembling the perforating gun assembly of claim 14, further comprising:

initiating the detonating cord without the detonating cord having to be attached to the detonator assembly.]

*16. A perforating gun, comprising:*

*a perforating gun housing;*

*a tandem seal adapter, wherein the perforating gun housing is connected at a first end to the tandem seal adapter and the tandem seal adapter is configured for sealing an interior of the perforating gun housing from an interior of an adjacent perforating gun housing and for being positioned between the interior of the perforating gun housing and the interior of the adjacent perforating gun housing;*

*a carrying device positioned within the perforating gun housing and configured for holding at least one shaped charge; and*

*a wirelessly-connectable selective detonator assembly contained entirely within the perforating gun housing and configured for being electrically contactably received within the perforating gun housing without using a wired electrical connection, the detonator assembly comprising:*

*a shell configured for housing components of the detonator assembly;*

*more than one electrically contactable component, wherein at least one of the electrically contactable*

*components extends from the shell and further wherein the more than one electrically contactable component comprises an electrically contactable line-in portion, an electrically contactable line-out portion, and an electrically contactable ground portion, the ground portion in combination with the line-in portion and the line-out portion being configured to replace a wired electrical connection to complete an electrical connection within the perforating gun housing merely by contact;*

*an insulator positioned between the line-in portion and the line-out portion, wherein the insulator electrically isolates the line-in portion from the line-out portion; and*

*an electronic circuit board configured to allow for selective detonation of the detonator assembly,*

*wherein the electronic circuit board is housed within the shell, and the detonator assembly is configured for electrically contactably forming the electrical connection within the perforating gun housing merely by the contact and without the need of manually and physically connecting wires.*

*17. The perforating gun of claim 16, wherein the electronic circuit board is in electrical communication with the line-in portion.*

*18. The perforating gun of claim 17, further comprising a capacitor positioned on the electronic circuit board, the capacitor being configured to be discharged to initiate the detonator assembly upon receipt of an ignition signal, and the ignition signal being electrically relayed directly through the line-in portion and the line-out portion.*

*19. The perforating gun of claim 16, further comprising a detonating cord positioned within the perforating gun housing such that at least a portion of the detonating cord is in contact with the detonator assembly.*

*20. The perforating gun of claim 16, wherein the detonator assembly is configured for initiating a detonating cord positioned within the perforating gun housing without the detonating cord having to be attached to the detonator assembly.*

*21. The perforating gun of claim 19, wherein the detonating cord is positioned in side-by-side contact with at least a portion of the shell.*

*22. The perforating gun of claim 16, wherein the detonator assembly is configured for preventing initiation in response to stray current or voltage or radio frequency signals.*

*23. A wirelessly connectable detonator assembly and detonator positioning assembly for orienting the wirelessly connectable detonator assembly in a perforating gun, comprising:*

*the wirelessly connectable detonator assembly, wherein the wirelessly connectable detonator assembly comprises*

*a shell containing detonator components;*

*an electrically contactable line-in portion in electrical communication with the detonator components;*

*an electrically contactable line-out portion in electrical communication with the line-in portion; and,*

*an electrical ground connection; and,*

*the detonator positioning assembly, wherein the detonator positioning assembly is configured for receiving the wirelessly connectable detonator assembly in the perforating gun, and the detonator positioning assembly includes a contactable ground portion.*

*24. The wirelessly connectable detonator assembly and detonator positioning assembly of claim 23, wherein the detonator components comprise an electronic circuit board, wherein the electronic circuit board is configured to initiate explosive components in response to receipt of an ignition signal.*

*25. The wirelessly connectable detonator assembly and detonator positioning assembly of claim 24, wherein the shell and the detonator assembly positioner are positioned in a gun carrier, and the gun carrier is in electrical communication with the contactable ground portion.*

*26. The wirelessly connectable detonator assembly and detonator positioning assembly of claim 24, further wherein the detonator positioning assembly aligns the shell such that the explosive components are ballistically connected with a detonating cord.*

*27. An arrangement of wirelessly connectable perforating guns, comprising:*

*a first wirelessly connectable perforating gun comprising a first wirelessly connectable detonator assembly and a first detonator positioning assembly for receiving the first wirelessly connectable detonator assembly in the first wirelessly connectable perforating gun, wherein*

*the first wirelessly connectable detonator assembly includes*

*a first shell containing detonator components,*

*a first electrically contactable line-in portion in electrical communication with the detonator components in the first shell,*

*a first electrically contactable line-out portion in electrical communication with the first electrically contactable line-in portion, and*

*a first electrical ground connection, wherein*

*the first detonator positioning assembly receives the first wirelessly connectable detonator assembly in the first wirelessly connectable perforating gun, and the first detonator positioning assembly positioner includes a contactable ground portion configured for electrically contacting the first electrical ground connection of the first detonator assembly;*

*a second wirelessly connectable perforating gun comprising a second wirelessly connectable detonator assembly and a second detonator positioning assembly for receiving the second wirelessly connectable detonator assembly in the second wirelessly connectable perforating gun, wherein*

*the second wirelessly connectable detonator assembly includes*

*a second shell comprising detonator components,*

*a second electrically contactable line-in portion in electrical communication with the detonator components in the second shell, and*

*a second electrical ground connection,*

*wherein the first electrically contactable line-out portion of the first wirelessly connectable detonator assembly is in electrical communication with the second electrically contactable line-in portion of the second wirelessly connectable detonator assembly, and*

*the second detonator positioning assembly receives the second wirelessly connectable detonator assembly in the second wirelessly connectable perforating gun, and includes a contactable ground portion;*

*a seal adapter positioned between the first wirelessly connectable perforating gun and the second wireless connectable perforating gun; and*

*a line-in contact initiating pin positioned in the seal adapter, the line-in contact initiating pin in electrical contact with the second electrically contactable line-in portion of the second wirelessly connectable detonator assembly without the use of a wired electrical connection, such that the line-in contact initiating pin relays an ignition signal from the first electrically contactable line-out portion of the first wirelessly connectable detonator assembly to the second electrically contactable line-in portion of the second wirelessly connectable detonator assembly.*

*28. The arrangement of wirelessly connectable perforating guns of claim 27, wherein:*

*the detonator components of the first shell comprise a first electronic circuit board, wherein the first electronic circuit board is configured to selectively detonate a first explosive component in response to the ignition signal; and*

*the detonator components of the second shell comprise a second electronic circuit board, wherein the second electronic circuit board is configured to selectively detonate a second explosive component in response to receipt of the ignition signal.*

*29. The arrangement of wirelessly connectable perforating guns of claim 27, further comprising:*

*a through wire in electrical contact with the first electrically contactable line-out portion of the first wirelessly connectable detonator assembly and the second electrically connectable line-in portion of the second wirelessly connectable detonator assembly.*

*30. The arrangement of wirelessly connectable perforating guns of claim 29, wherein the through wire extends between the first electrically connectable line-out portion of the first wirelessly connectable detonator assembly and the line-in contact initiating pin.*

*31. The arrangement of wirelessly connectable perforating guns of claim 27, wherein the second shell defines a central axis and the line-in contact initiating pin contacts the second electrically connectable line-in portion of the second wirelessly connectable detonator assembly at a point on the central axis.*

*32. The arrangement of wirelessly connectable perforating guns of claim 27, wherein the first shell and the second shell are each shaped as a hollow cylinder.*

* * * * *